(12) United States Patent
Aharon et al.

(10) Patent No.: US 7,630,549 B2
(45) Date of Patent: Dec. 8, 2009

(54) GPU ACCELERATED MULTI-LABEL DIGITAL PHOTO AND VIDEO EDITING

(75) Inventors: Shmuel Aharon, West Windsor, NJ (US); Leo Grady, Yardley, PA (US); Thomas Schiwietz, Plainsboro, NJ (US)

(73) Assignee: Siemens Medical Solutions USA. Inc., Malvern, PA (US)

( * ) Notice: Subject to any disclaimer, the term of this patent is extended or adjusted under 35 U.S.C. 154(b) by 737 days.

(21) Appl. No.: 11/242,549

(22) Filed: Oct. 3, 2005

(65) Prior Publication Data

US 2006/0104513 A1 May 18, 2006

Related U.S. Application Data

(60) Provisional application No. 60/628,035, filed on Nov. 15, 2004.

(51) Int. Cl.
*G06K 9/34* (2006.01)
(52) U.S. Cl. .................................................... 382/173
(58) Field of Classification Search ........................ None
See application file for complete search history.

(56) References Cited

U.S. PATENT DOCUMENTS

| | | | | |
|---|---|---|---|---|
| 5,956,015 | A * | 9/1999 | Hino | 345/600 |
| 5,978,497 | A * | 11/1999 | Lee et al. | 382/133 |
| 6,005,967 | A * | 12/1999 | Nakagawa et al. | 382/154 |
| 6,154,216 | A * | 11/2000 | Walton | 345/619 |
| 6,718,063 | B1 * | 4/2004 | Lennon et al. | 382/224 |
| 6,744,923 | B1 * | 6/2004 | Zabih et al. | 382/226 |
| 2004/0008886 | A1 * | 1/2004 | Boykov | 382/173 |
| 2004/0086185 | A1 * | 5/2004 | Sun | 382/224 |
| 2004/0156544 | A1 * | 8/2004 | Kajihara | 382/167 |
| 2005/0163375 | A1 | 7/2005 | Grady | |

OTHER PUBLICATIONS

Shi et al, "Normalized Cuts and Image Segmentation", IEEE Trans. Pattern Analysis and Machine Intelligence, vol. 22, pp. 888-890, Aug. 2000.*
"Multi-label Image Segmentation for Medical Applications Based on Graph-Theoretic Electrical Potentials", Leo Grady and Gareth Funka-Lea, CVAMIA-MMBIA 2004, LNCS 3117, pp. 230-245, 2004.*

(Continued)

*Primary Examiner*—Yuzhen Ge
(74) *Attorney, Agent, or Firm*—Donald B. Paschburg; F. Chau & Associates, LLC

(57) ABSTRACT

A method and system for segmenting an object in a digital image are disclosed. A user selects at least one foreground pixel or node located within the object and at least one background pixel or node located outside of the object. A random walk algorithm is performed to determine the boundaries of the object in the image. In a first step of the algorithm, a plurality of coefficients is determined. Next, a system of linear equations that include the plurality of coefficients are solved to determine a boundary of the object. The processing is performed by a graphics processing unit. The processing can be performed using the near-Euclidean LUV color space or a Lab color space. It is also preferred to use a Z-buffer in the graphics processing unit during processing. The object, once identified, can be further processed, for example, by being extracted from the image based on the determined boundary.

29 Claims, 15 Drawing Sheets

OTHER PUBLICATIONS

J. Bolz, I. Farmer, E. Grinspun, and P. Schröder, "Sparse matrix solvers on the gpu; conjugate gradients and multigrid," in *ACM Transactions on Graphics*, ser. SIGGRAPH, vol. 22, No. 3, Jul. 2003, pp. 917-924.

J. Kruger and R. Westermann, Linear algebra operators for gpu implementation of numerical algorithms, ACM Transactions on Graphics, ser. SIGGRAPH, vol. 22, No. 3, Jul. 2003, pp. 908-916.

Dissertation, L. Grady, Space-Variant Computer Vision: a Graph-Theoretic Approach, Boston University, 2004.

\* cited by examiner

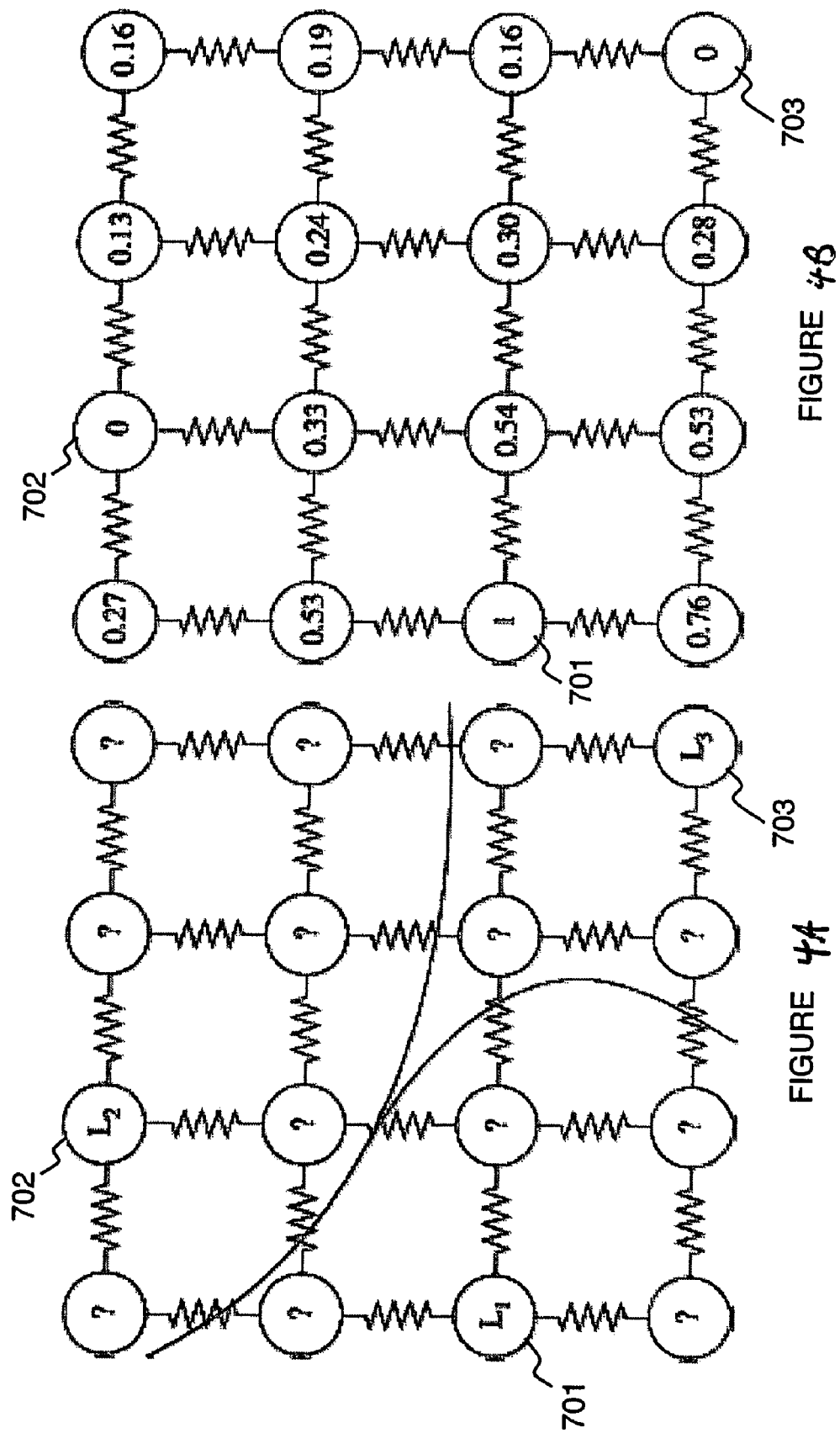

GPU ACCELERATED MULTI-LABEL DIGITAL PHOTO AND VIDEO EDITING

CROSS-REFERENCE TO RELATED APPLICATIONS

This application claims the benefit of U.S. Provisional Application No. 60/628,035, filed Nov. 15, 2004, which is incorporated herein by reference.

BACKGROUND OF THE INVENTION

The present invention relates to the editing of digital still photographs and of video images.

Digital photography is very popular and there are many digital images—both still and video—being generated. Photographers, including members of the general public, are very interested in being able to edit the digital images being generated. The editing involves many different operations. For example, many users want to crop one object from a first picture and crop another object from a second picture and add these objects to a new picture, such as a collage. This function, as well as other editing functions, require the identification of structures or objects within an image.

Tools are available that allow editing of this nature to take place. For example, digital image editing tools available today provide such editing tools. Photoshop, one of the readily available editing tools, provides a Magic Wand tool and an Intelligent Scissors tool, each of which allow a user to attempt to crop an object from an image. In the Magic Wand tool, the user clicks on a point and Photoshop attempts to isolate or segment the object. Often times, several attempts are needed to successfully segment the selected object. In the Intelligent Scissors tool, the user clicks on the boundary. Both of these tools are problematic and time consuming to use, and create frustration on the part of the users.

Manufacturers of digital cameras are also providing software tools with their cameras that provide some editing capabilities. These software tools, in some cases allow the cropping of objects from images, and therefore segment objects. However, they also provide limited capabilities. They are also slow and problematic in their use.

Thus, new and improved method and systems to segment selected objects in digital images (still and video), and to provide quicker segmentation of the selected objects, are needed.

SUMMARY OF THE INVENTION

The present invention provides a method and system for segmenting objects in a picture using a random walk algorithm that determines the probability that each of the image pixels belongs to one of the objects. The solution to the random walk algorithm is preferably determined in a graphics processing unit in accordance with one aspect of the present invention.

In accordance with one aspect of the present invention, a method of segmenting an object in a digital image wherein a foreground pixel located within the object and a background pixel located outside of the object have been selected, is provided. In a first step, a plurality of coefficients is determined based on an analysis of the data in the image. In a black and white digital image, the coefficients are preferably determined by a function of the relative image intensity between two pixels. In a color digital image, the coefficients are preferably determined by a function of the relative color values between two pixels. Each of the coefficients represents a relative likelihood that neighboring pixels belong to the same object. Next, a system of linear equations is solved that include the plurality of coefficients to determine a boundary of the object using a graphics processing unit.

In accordance with further aspects of the present invention, the object is extracted from the digital image based on the boundary. The extracted object can then be used in any desired way. For example, it can be pasted into a new image or a document.

In accordance with a further aspect of the present invention, the plurality of coefficients is determined using the near-Euclidean LUV color space or the Lab color space. The Lab color space is preferred. In accordance with another aspect of the present invention, user marked foreground pixels and user marked background pixel are masked out by a Z-buffer in a graphics processing unit during processing and to accelerate performance. This allows these user selected pixels to be masked out during processing. Thus, the user marked foreground pixels and the user marked background pixels are not processed by the graphics processing unit.

In accordance with another aspect of the present invention, these steps can be performed as part of an imaging editing tool. For example, software that performs in accordance with the precepts outlined herein can be provided as part of a software tool provided with digital cameras and with video cameras. The software that operates in accordance with the present invention could also be provided with an editing tool such as Photoshop.

The system and method of the present invention can be used to segment objects from digital still images. They can also be used to segment objects from video images. Further, they can be used to segment objects from images from a variety of sources, such as images from medical imaging devices, such as a MRI, CT scan etc.

The system used in accordance with various aspects of the present invention includes a personal computer. The personal computer preferably includes a graphics processing card that includes a graphics processing unit. The processing necessary to determine the boundary of the object in accordance with the present invention is preferably accomplished in the graphics processing unit.

In accordance with another aspect of the present invention, a method and system of segmenting a digital image having K objects, with K being greater than or equal to 2, are presented. K systems of linear equations are created in accordance with the random walk algorithm described herein. These systems of linear equations are solved through iterative passes, preferably using a graphics processing unit. When K−1 of the systems has converged to an answer, then all processing directed to solving the systems of linear equations is terminated, thereby saving processing time.

DESCRIPTION OF THE PREFERRED EMBODIMENT

Figure 1:
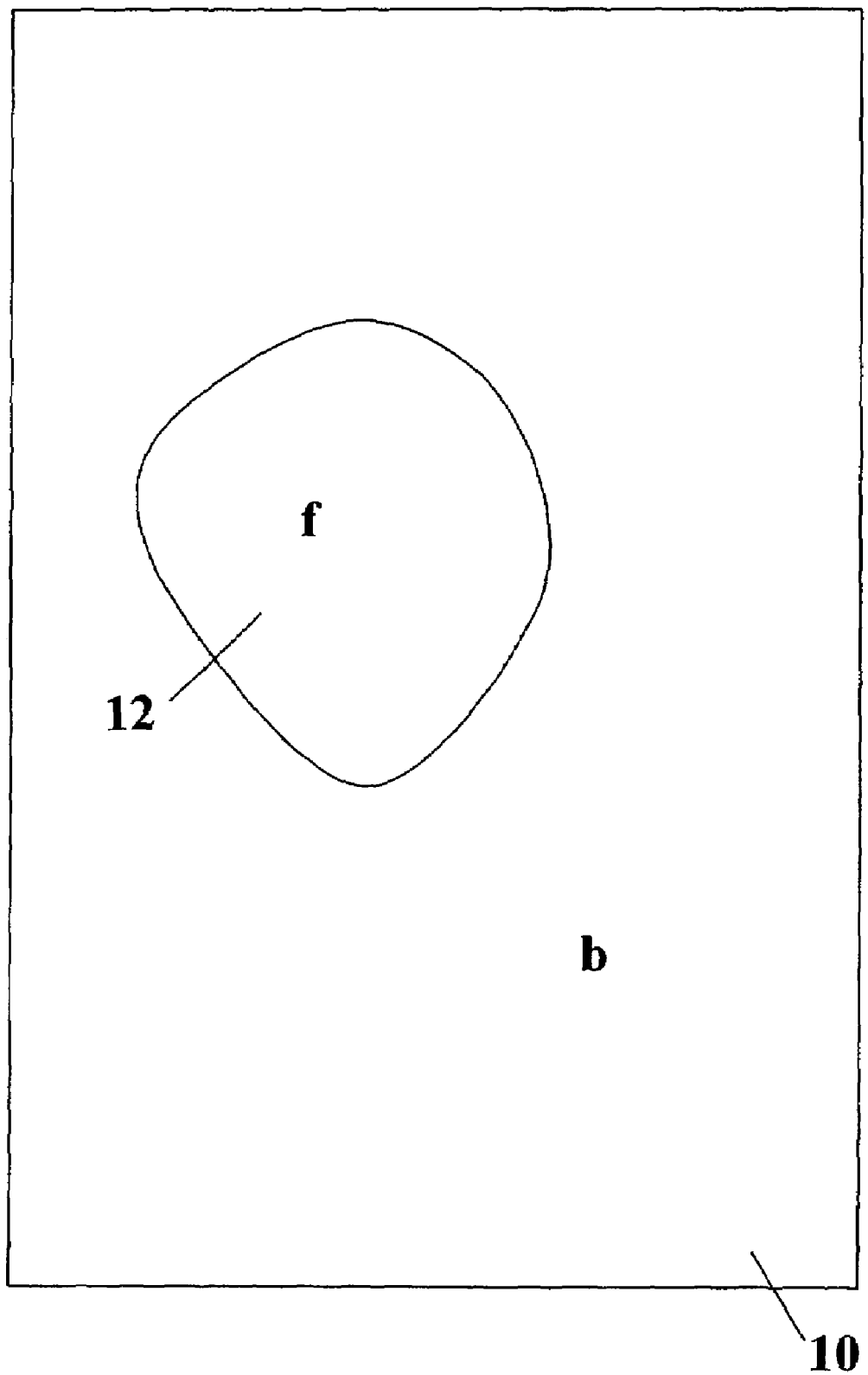
FIG. 1 illustrates a digital image with a plurality of objects with a foreground pixel marked and with a background pixel marked.

The present invention provides for the segmentation of objects in a digital image. Segmentation refers to the identification of the boundaries of the object in the image. Once the boundaries of the object have been identified, the object can be processed by editing tools. For example, the definition of the boundary can be used to remove or to copy the object from a first image and placed in a second image. Additionally, the object can be modified or edited in any other way using available digital editing tools.

In one aspect of the present invention, the random walker algorithm is used to determine the boundaries of the object in an image. In accordance with another aspect of the present invention, the random walker algorithm equations are solved in a graphic processor unit. The random walker algorithm is described in U.S. patent application Ser. No. 11/029,442, filed on Jan. 5, 2005, and in U.S. Provisional Application No. 60/538,670, filed on Jan. 23, 2004, both of which are hereby incorporated by reference. The random walker process is also described in L. Grady and G. Funka-Lea. Multi-label image segmentation for medical applications based on graph-theoretic electrical potentials, in M. Sonka, I. A. Kakadiaris, and J. Kybic, editors, *Computer Vision and Mathematical Methods in Medical and Biomedical Image Analysis, ECCV 2004 Workshops CVAMIA and MMBIA*, number LNCS3117 in Lecture Notes in Computer Science, pages 230-245, Prague, Czech Republic, May 2004, Springer, which is hereby incorporated by reference.

Using the random walker technique, a pixel is segmented to determine whether the pixel is part of an object or not. By segmenting the pixels in a digital image, the boundary of the object can be computed.

This is accomplished by first picking a pixel or a node in the image that is located within the object, referred to as a foreground node. Then a pixel or a node in the image that is outside the object or in another object is selected and is referred to as a background node. This is referred to as marking or labeling or seeding the pixels. Then, each pixel is processed by determining the probability that a random walker starting its walk at that pixel first reaches each of the labels. The pixel is then assigned the label with the greatest probability, so that the algorithm determines which label the pixel is more closely associated with and therefore determines whether the pixel is part of the object being segmented or not. A user-specified label is a pixel (or a voxel) that has been given a labeling by the user, usually as a result of a mouse click over the pixel. It has been demonstrated that the probabilities may be computed analytically by determining weighting coefficients and then solving a sparse, symmetric, positive-definite, system of linear equations that use the weighting coefficients, instead of performing a random walk simulation. See, for example, L. Grady and G. Funka-Lea. Multi-label image segmentation for medical applications based on graph-theoretic electrical potentials, in M. Sonka, I. A. Kakadiaris, and J. Kybic, editors, *Computer Vision and Mathematical Methods in Medical and Biomedical Image Analysis, ECCV 2004 Workshops CVAMIA and MMBIA*, number LNCS3117 in Lecture Notes in Computer Science, pages 230-245, Prague, Czech Republic, May 2004, Springer.

Conceptually, the random walk algorithm has been associated with a circuit theory problem. The seed in the object can be considered a voltage source and the seed outside the object can be considered a ground. Depending on the route from a selected pixel to the voltage source or the ground, various resistances are offered. By analyzing the resistance paths, it can be determined whether the pixel should be associated with the voltage source or the ground. As a result of this conceptual connection, it has been realized that techniques available to solve circuit theory problems are also available to solve the random walk algorithm.

Referring to FIG. 1, an image 10 with an object 12 is illustrated. It is desired to segment the object 12. To do so, the boundaries of the object 12 must be determined based on an analysis of the data image 10. The object 12 can be a person, a house, a plane or any other object having all or part of a boundary in an image.

To select an object 12 to be segmented, a user selects or marks a foreground pixel or voxel and a background pixel or voxel. This can be accomplished with a personal computer by positioning an icon inside the object 12 and clicking with a mouse. The foreground pixel or voxel is located within the object 12 in the image 10 and the background pixel or voxel is located outside the object 12 in the image 10. Referring to FIG. 1, the marked foreground pixel is indicated as f. The marked background pixel is indicated as b.

Figure 2:
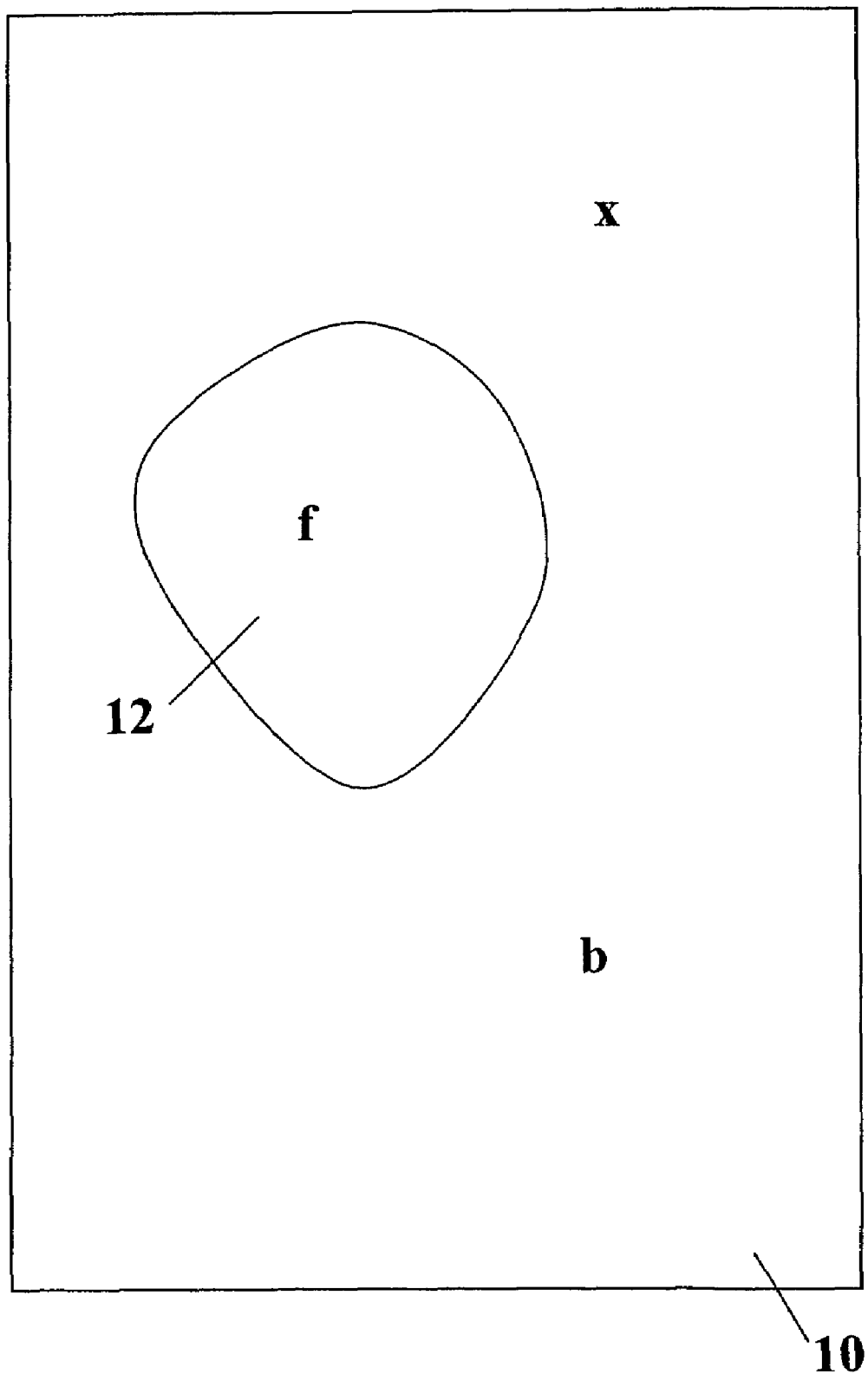
FIGS. 2 and 3 illustrate the probabilities of moving from a first pixel to a second pixel as a function of the marked pixels.

According to the random walk algorithm, each pixel is analyzed by determining the probability a random walker starting at that pixel will first reach the marked foreground pixel f and the probability it will first reach the marked background pixel b. Thus, referring to FIG. 2, accordance with one aspect of the present invention, the probability that the foreground pixel f would be reached from the pixel x is determined. Also, the probability that the background pixel b would be reached from the pixel x is determined. The higher probability is assigned to the pixel x. In FIG. 2, the probability that a random walker starting at pixel x would first reach background pixel b is greater than the probability that a random walker starting at pixel x would first reach foreground pixel f because the pixel x is located outside the object 12. Thus, in FIG. 2 it is determined from the two calculated probabilities that the pixel x is located outside the object 12.

Figure 3:
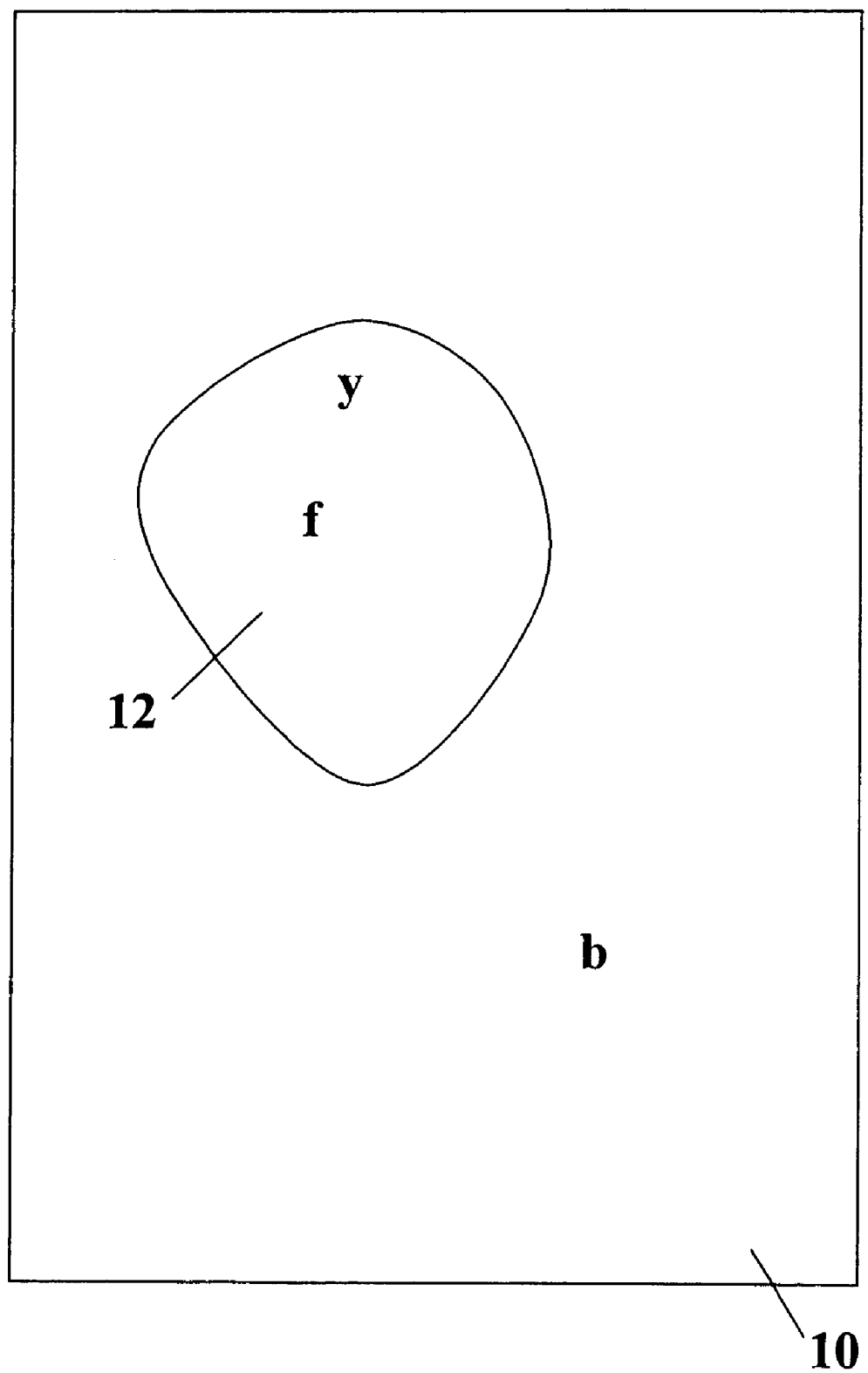

FIG. 3 illustrates the situation when a pixel y is located in the object 12. The probabilities of a random walker starting at pixel y to be first reaching the foreground pixel f and the background pixel b are determined by performing the random walk algorithm. The higher probability is assigned to the pixel y. In this case, it will be determined that the probability of reaching the foreground pixel f from the pixel y is greater than the probability of reaching the background pixel b because the pixel y is located inside the object 12.

In accordance with the random walk process, the probabilities associated with all of the pixels in an image are determined. Thus, it is determined whether each pixel is within or outside the object 12, and the boundary of the object 12 can be determined.

Solving for the probabilities associated with each pixel is known, but is very time consuming. See, for example, L. Grady and G. Funka-Lea. Multi-label image segmentation for medical applications based on graph-theoretic electrical potentials, in M. Sonka, I. A. Kakadiaris, and J. Kybic, editors, *Computer Vision and Mathematical Methods in Medical and Biomedical Image Analysis, ECCV* 2004 *Workshops CVAMIA and MMBIA*, number LNCS3117 in Lecture Notes in Computer Science, pages 230-245, Prague, Czech Republic, May 2004, Springer. In accordance with one aspect of the present invention, it is preferred to solve the random walk system by first calculating weighting coefficients that are then applied to a system of linear equations which can be solved. For grayscale images, the weighting coefficients are preferably calculated by:

$$w_{ij} = \exp(-\beta(I_i - I_j)^2)$$

where $w_{ij}$ represents the weight between nodes $v_i$ and $v_j$, $\beta$ is a free parameter, $I_i$ is the image intensity at node $v_i$ and $I_j$ is the image intensity at node $v_j$. A preferred value of $\beta$ is 900, although other values can be used. This assumes that the values have been normalized.

For color images, the weighting coefficients are preferably calculated by:

$$w_{ij} = \exp(-\beta \|C_i - C_j\|^2)$$

where $w_{ij}$ represents the weight between nodes $v_i$ and $v_j$, $\beta$ is a free parameter, $C_i$ is the vector of color values at node $v_i$ and $C_j$ is the vector of color values at node $v_j$. A preferred value of $\beta$ is 900, although other values can be used. Once again, it is assumed that the values have been normalized. $\|*\|$ represents the vector norm function, a very well known function.

When calculating these weighting coefficients, the red-green-blue (RGB) vectors can be used. However, in accordance with an alternate embodiment, the perceptually near-Euclidean LUV color space is more appropriate for setting the weights. The Lab color space, however, is preferably used. Accordingly, if necessary, a conversion is performed to obtain the data in the LUV color space or in the Lab color space. Then a system of linear equations that include the weighting coefficients is solved.

The details of solving the multi-label image segmentation algorithm presented herein will now be presented. This is an algorithm that can be used to perform semi-automatic image segmentation given labeled pixels specified by a user or a computer. The algorithm was formulated by assuming, for example, that a user has labeled P pixels (termed "seeds") with one of K labels. Then, for each unlabeled pixel in the set of image data, determining the probability that a random walker starting at this location (i.e., an arbitrary unlabeled pixel) first reaches a seed point with each of the K labels.

Using the algorithm, the probability that a random walker starting at the location first reaches each of the K seed points may be determined without simulating a random walk. Instead, by analogy with circuit theory, these probabilities may be computed by solving a system of linear equations for each label. Thus, a K-tuple vector is computed for each pixel that specifies the probability that a random walker starting from the unlabeled pixel will first reach a seed pixel bearing each of K labels. A final segmentation is then derived from the K-tuples by selecting for each pixel the most probable seed destination for a random walker starting from that location.

In a uniform image (e.g., an all black image), it is known that this segmentation approach will produce a segmentation that roughly corresponds to Voronoi cells for each of the seed points. This segmentation is termed a neutral segmentation because it does not take into account any information from the image. By biasing the random walker to avoid crossing sharp intensity gradients, a quality segmentation is obtained that respects object boundaries including, for example, weak boundaries.

It has been established that the probability a random walker reaches a seed point with a label s equals the solution to the Dirichlet problem obtained by fixing unity Dirichlet boundary conditions at seeds labeled s and fixing a zero boundary condition at seeds with labels not equal to s. The solution to the discrete Dirichlet problem on an arbitrary graph is given by the distribution of electric potentials on the nodes of an electrical circuit with resistors representing the inverse of weights (i.e., the weights represent conductance) and boundary conditions given by voltage sources fixing the electric potential at boundary nodes (i.e., seeds). For the remainder of this discussion, the terminology of circuit theory will be used to describe the algorithm, with, for example a potential $x_i^s$ indicating the probability that a walker starting at node $v_i$ first reaches a seed point with the label s.

Figures 4C, 4D:
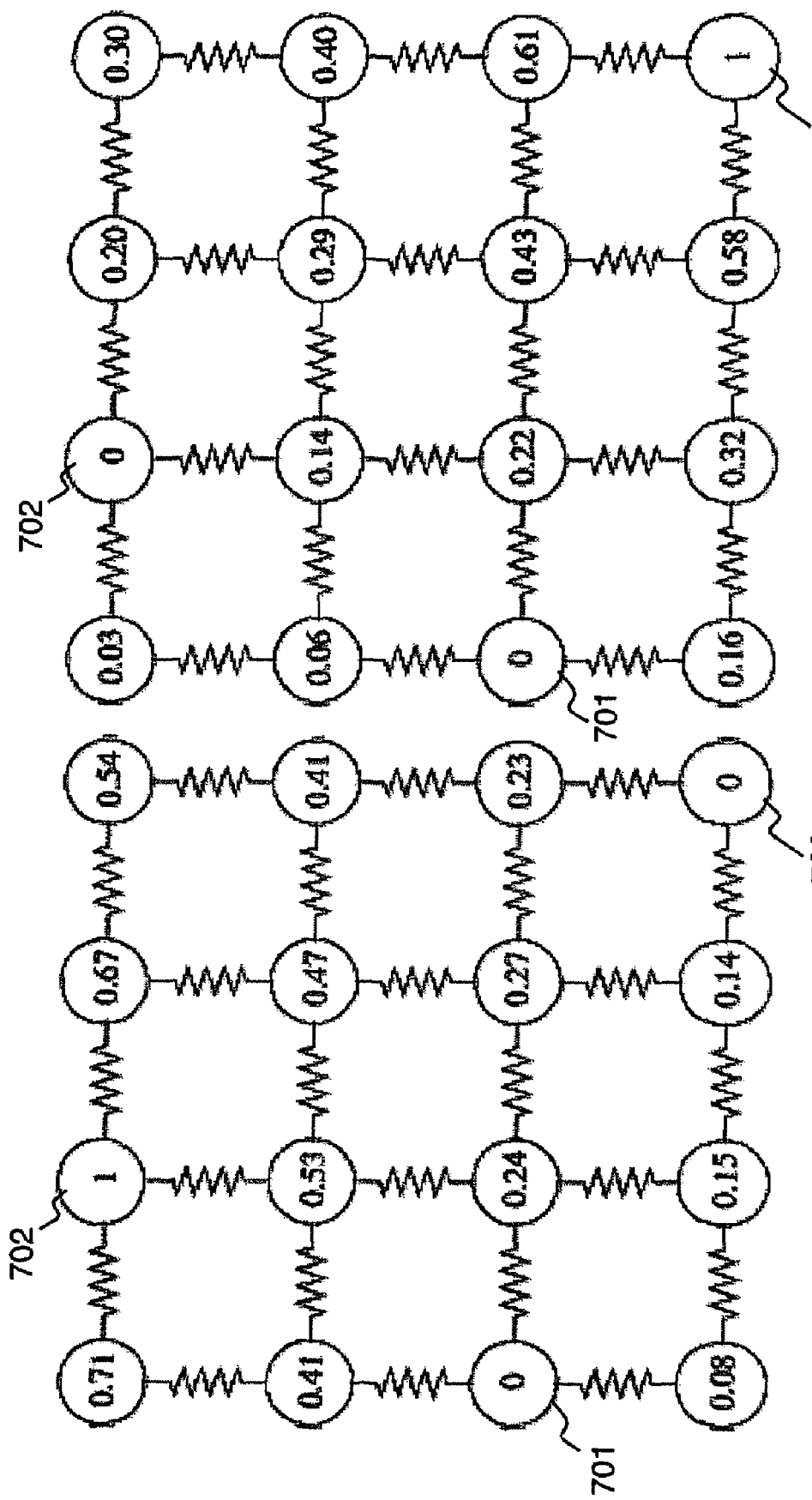
FIG. 4 illustrates a graph with unit weights in the presence of seed with different labels.

A function that solves the Dirichlet problem for a given set of boundary conditions (i.e., the random walker probabilities) is known as a harmonic function. FIG. 4 illustrates harmonic functions and a subsequent segmentation obtained for a 4×4 graph with unit weights in the presence of three seeds with different labels. As shown in FIG. 4, the three seed points with three different labels (i.e., $L_1$, $L_2$, $L_3$), alternately fix the potential of each label to unity (i.e., with a voltage source tied to ground) and set the remaining nodes to zero (i.e., ground). The calculated electric potentials represent the probability that a random walker starting at each node first reaches the seed point currently set to unity. Image (a) of FIG. 4 shows the initial seed points and the segmentation resulting from assigning each node the label that corresponds to its greatest probability. Images (b), (c) and (d) of FIG. 4 show the probability that a random walker starting from each node first reaches seeds $L_1$, $L_2$ and $L_3$, respectively.

In light of the equivalence between random walks on graphs and discrete potential theory, the probability that a random walker starting at pixel $v_i$ first reaches a seed with the label s, is calculated by solving the circuit theory problem that corresponds to a discrete analog of the Dirichlet problem. All seed points belonging to labels other than s are grounded (i.e., their potential is set to zero). A unit voltage source with ground that fixes the s-labeled seeds to have a unit potential is then established.

The electric potentials established at each unlabeled node provide the probabilities that a walker originating from that node will first reach the seed with the label s. The electric potentials may be calculated through the solution of a system of sparse linear equations (described below under the heading "Discrete Dirichlet Problem"). The full K-tuple may be calculated by finding the potentials established through switching "on" (e.g., by providing a unit voltage source thereto) each labeled collection of nodes and "off" (e.g., by grounding) the remaining labeled nodes. As a result, K−1 systems of linear equations must be solved. By linearity (i.e., the principle of superposition in circuit theory), the calculated potentials must sum to unity. This enables one of the systems to be solved by subtracting the sum of the calculated potentials from unity to find the last entry in the full K-tuple.

Before discussing specific aspects of the multi-label segmentation algorithm, a graph must be defined for explanatory purposes. In particular, a graph consists of a pair G=(V, E) with vertices (nodes) v∈V and edges e∈E⊂V×V. An edge, e, spanning two vertices, $v_i$ and $v_j$, is denoted by $e_{ij}$. A weighted graph assigns a value to each edge called a weight. The weight of an edge, $e_{ij}$, is denoted by $w(e_{ij})$ or $w_{ij}$. The degree of a vertex $d_i=\Sigma w(e_{ij})$ for all edges $e_{ij}$ incident on $v_i$. In order to interpret $w_{ij}$ as the bias affecting a random walker's choice, $w_{ij}>0$ is required. The following discussion will assume the graph is connected.

Edge Weights

In order to represent an image structure (composed of pixels) by random walker biases (i.e., edge weights), a function that maps a change in image intensities of the image to weights of the underlying graph must be determined. Several known weighting functions may be employed such as the Gaussian weighting function or pre-smoothed variants with various kernels. For purposes of this description, however, the Gaussian weighting function presented earlier and given by $$w_{ij}=\exp(-\beta(I_i-I_j)^2), \quad [1]$$

will be used. Where $I_i$ indicates the image intensity a pixel i and $g_j$ indicates image intensity at image element j. The value of β is a free parameter. Other weighting functions can be used.

Discrete Dirichlet Problem

As the discrete Dirichlet problem has been thoroughly discussed in previous works such as Norman Biggs' "Algebraic Potential Theory on Graphs" (Bulletin of London Mathematics Society, 1997, 29, pp. 641-682), which is hereby incorporated by reference. The application to the multi-label image segmentation algorithm will only be discussed here.

When solving the discrete Dirichlet problem the discrete Laplacian matrix is defined as, $$L_{v_i v_j} = \begin{cases} d_{v_i} & \text{if } i = j, \\ -w_{ij} & \text{if } v_i \text{ and } v_j \text{ are adjacent nodes,} \\ 0 & \text{otherwise,} \end{cases} \quad [2]$$

where $Lv_iv_j$ is used to indicate that the matrix L is indexed by vertices $v_i$ and $v_j$.

The vertices $v_i$ and $v_j$ are partitioned into two sets, $V_M$ (i.e., marked/seed nodes) and $V_U$ (i.e., unmarked nodes) such that $V_M \cup V_U = V$ and $V_M \cap V_U = 0$. $V_M$ contains all seed points irrespective of their labels. The matrix L is reordered as such to reflect its subsets $$L = \begin{bmatrix} L_M & B \\ B^T & L_U \end{bmatrix} \quad [3]$$

Next, the probability (i.e., the potential) assumed at each node, $v_i$, for each label s, by $x_i^s$ is denoted. The set of labels for the seed points are defined as a function $Q(v_j)=s$, $\forall v_j \in V_M$, where s ∈ Z, 0<s≦K. The marked vector $|V_M|\times 1$ is defined (where |.| denotes cardinality) for each label, s, at node $v_j \in V_M$ as $$m_j^s = \begin{cases} 1 & \text{if } Q(v_j) = s, \\ 0 & \text{if } Q(v_j) \neq s. \end{cases} \quad [4]$$

The combinatorial Dirichlet problem may then be found by solving $$L_U x^s = -Bm^s, \quad [5]$$

which is a sparse, symmetric, positive-definite, system of linear equations with $|V_U|$ number of equations and a number of nonzero entries equal to 2|E|. Because $L_U$ is guaranteed to be nonsingular for a connected graph, the solution $x^s$ is guaranteed to exist and be unique. Therefore, the potentials for all the labels may be found by solving $$L_U X = -BM, \quad [6]$$

where X has columns taken by each $x^s$ and M has columns given by each $m^s$. Therefore, there are K−1 sparse linear systems to solve, where K is the total number of labels.

Theoretical Properties of the Multi-Label Image Segmentation Algorithm

Several theoretical properties and/or propositions of the multi-label image segmentation algorithm will now be discussed. First, if an interpolation is desired between the solution for a particular image and the neutral segmentation, this may be achieved through the addition of a constant to the weights. Second, an ideal weighting function will produce weights such that the presence of independent random noise at the pixel level produces uncorrelated multiplicative noise at the level of the weights. Finally, it will be shown that a segmentation using the multi-label image segmentation algorithm in the case of pure or almost pure noise is expected to be the neutral segmentation.

The following two properties: (1) a potential $0 \leq x_i^s \leq 1$, ∀ i, s (maximum/minimum principle) and (2) the potential of each unlabeled node assumes the weighted average of its neighboring nodes, are discrete analogues of properties of continuous harmonic functions and may be seen directly by viewing the solution to the combinatorial Dirichlet problem as a solution to the discrete Laplace equation (with Dirichlet boundary conditions), where the potential of each unlabeled node must satisfy $$x_i^s = \frac{1}{d_i} \sum_{e_{ij} \in E} w(e_{ij}) x_j^s, \quad [7]$$

where $x_j^s \in V$ (may include seed points).

Addressing the first proposition, if the final segmentation is determined from the potentials using the above rule (i.e., the node $v_i$ is assigned to a segment s, only if $x_i^s > x_i^f$ ∀ f≠s), then each node assigned to the segment s is connected through a path of nodes also assigned to the segment s and to at least one of the seed points with a label s. In other words, the connected components generated by the final segmentation must contain at least one seed point bearing that label.

The result follows if it can be shown that any connected subset P ⊆ $V_U$ assigned to the segment s must be connected to at least one node that is also labeled s. A block matrix form of equation [7] may be written as $$L_P x_P^s = -R x_{\bar{P}}^s, \quad [8]$$

where $x_P{}^s = [x_p{}^s, x_{\bar{P}}{}^s]^t$, L has been decomposed into the block form $$L = \begin{bmatrix} L_P & R_P \\ R_P^T & L_{\bar{P}} \end{bmatrix}, \qquad [9]$$

and $\bar{P}$ denotes the set complement of P in V. For example, in the case of $P=\{v_i\}$ in equation [7], $L_P = d_i$ and $$-R_P x_{\bar{P}}^s = \sum_{e_{ij} \in E} w(e_{ij}) x_j^s.$$

If $x_P{}^s > x_P{}^f \ \forall \ f \neq s$, then $x_P{}^s - x_P{}^f > 0$ and $-L_P^{-1} R_P(x_{\bar{P}}^s - x_{\bar{P}}^f) > 0$. The entries of $R_P$ are nonpositive by definition of L. Because L is an M-matrix, any block diagonal submatrix of the M-matrix is also an M-matrix, and the inverse of the M-matrix has nonnegative entries, then $-L_P^{-1} R$ has nonnegative entries and therefore, some $x_i{}^s \in \bar{P}$ must be greater than $x_i{}^f \in \bar{P}$. Further, because the entries of $R_P$ are zero for nodes not connected to P, the nodes in $\bar{P}$ satisfying the inequality must be connected to a node in P.

Proof of the remaining theoretical propositions rest on the following lemma. That is, for random variables, X, A and B, $$X = \frac{A}{B}.$$

$E[X] = 0$ if $E[A] = 0$ and $B > 0$.

Addressing the second proposition, by the Hölder inequality $E[A] = E[X\,B] \leq E[X]E[B]$. By the same inequality, $$E[X] = E\left[\frac{A}{B}\right] \leq E[A]E\left[\frac{1}{B}\right].$$

Therefore, $$\frac{E[A]}{E[B]} \leq E[X] \leq E[A]E\left[\frac{1}{B}\right],$$

and the result is provided. Because it is known that there is a relationship between the potentials solved for in equation [5] and the weighted tree structure of the graph. The following relationship for the potential at node $v_i$ in the presence of unit voltage sources (tied to ground) is given by $$x_i^s = \frac{\sum_{TT \in TT_i} \prod_{e_{ij} \in TT} w(e_{ij})}{\sum_{TT \in TT_G} \prod_{e_{ij} \in TT} w(e_{ij})}, \qquad [10]$$

where $TT_i$ is the set of 2-trees present in the graph, such that node $v_i$ is connected to a seed with a label s, and $TT_G$ is the set of all possible 2-trees in the graph. A 2-tree is defined as a tree with one edge removed. Note that $TT_i \subseteq TT_G \ \forall \ v_i$ with equality holding if $v_i$ is the seed point labeled s. In other words, in equation [10], if you sum over the product of the weights in every 2-tree that has $v_i$ connected to a seed with the label s and divide that sum by the sum of the product of the weights of the edges in every 2-tree that exists in the graph, that ratio is equal to the potential found by solving equation [5].

If the weights are uniform as shown in the neutral case, equation [10] yields potentials satisfying $$x_i^s = \frac{|TT_i|}{|TT_G|}. \qquad [11]$$

Thus, a series of propositions about $x^s$ under different conditions can be proved. For example, if the set of weights $w_{ij}$ are identically distributed (not necessarily independent) random variables, with $w_{ij} > 0$, then $E[x_i{}^s]$ equals the potential obtained in the neutral segmentation. This proposition is proved using the lemma. Next, the potential for the label s at $v_i$ for the neutral segmentation by $n_i{}^s$ is denoted. The complement of $TT_i$ in $TT_G$ as $TT_C$ is denoted as $TT_i \cup TT_C = $ and $TT_i \cap TT_C = 0$. For brevity, the following is also denoted $$S_{TT_i} = \sum_{TT \in TT_0} \prod_{e_{ij} \in TT} w(e_{ij}).$$

$E[x_i{}^s - n_i{}^s]$ is given by the following equation, $$E[x_i^s - n_i^s] = E\left[\frac{S_{TT_i}}{S_{TT_i} + S_{TT_C}} - \frac{|TT_i|}{|TT_i| + |TT_C|}\right]. \qquad [12]$$

Because each of the 2-trees will contain an equal number of edges (n−2), and all the weights are identically distributed, $S_{TTi}$ will contain the sum of $|TTi|$ identically distributed random variables. For the following discussion $\mu$ will denote the mean of the distribution of these new variables.

After combining terms, the numerator of equation [12] is given by $$E[S_{TT_i}(|TT_i|+|TT_C|) - |TT_i|(S_{TT_i}+S_{TT_C})] = \mu|TT_i|(|TT_i|+|TT_C|) - |TT_i|(\mu|TT_i|+\mu|TT_C|) = 0, \qquad [13]$$

and the denominator of equation [12] must be positive because all the $w_{ij}$ are guaranteed to be positive. Therefore, the conditions of the lemma are satisfied for the left hand side of equation [12] to be equal to zero and $E[x_i{}^s] = n_i{}^s$.

Because the following two propositions may be proved using the technique just described they will not be proved herein in an effort to avoid repetition. First, if the set of weights $w_{ij}$ are uncorrelated (not necessarily independent) random variables with corresponding means $\mu_{ij}$, then $E[x_i{}^s]$ equals the potential obtained by setting $w_{ij} = k_{ij}$. Second, if $w_{ij} = k_{ij} y_{ij}$, where the $k_{ij}$ are (not necessarily equal) constants and $y_{ij}$ are identically distributed random variables such that $y_{ij} > 0$, then $E[x_i{}^s]$ equals the potential obtained by setting $w_{ij} = k_{ij}$.

As another proposition, if $w_{ij} = k_{ij} + r$, where $k_{ij}$ are (not necessarily equal) constants and $r$ is a constant added to all weights, $\lim_{T \to \infty} x_i{}^s = n_i{}^s$, where $n_i{}^s$ is the potential obtained in the neutral segmentation. In order to prove this, the potential for node $v_i$ is expressed as $$x_i^s = \frac{\sum_{TT \in TT_i} \prod_{e_{ij} \in TT} (k_{ij} + r)}{\sum_{TT \in TT_G} \prod_{e_{ij} \in TT} (k_{ij} + r)} = \frac{|TT_i|r^{N-2} + \mathcal{O}(r^{N-3})}{|TT_G|r^{N-2} + \mathcal{O}(r^{N-3})}, \quad [14]$$

where $\mathcal{O}(\cdot)$ indicates a term order of no greater than the argument. Thus, by l'Hôpital's Rule, $$\lim_{r \to \infty} x_i^s = \frac{|TT_i|}{|TT_G|} = n_i^s. \quad [15]$$

Figure 5:
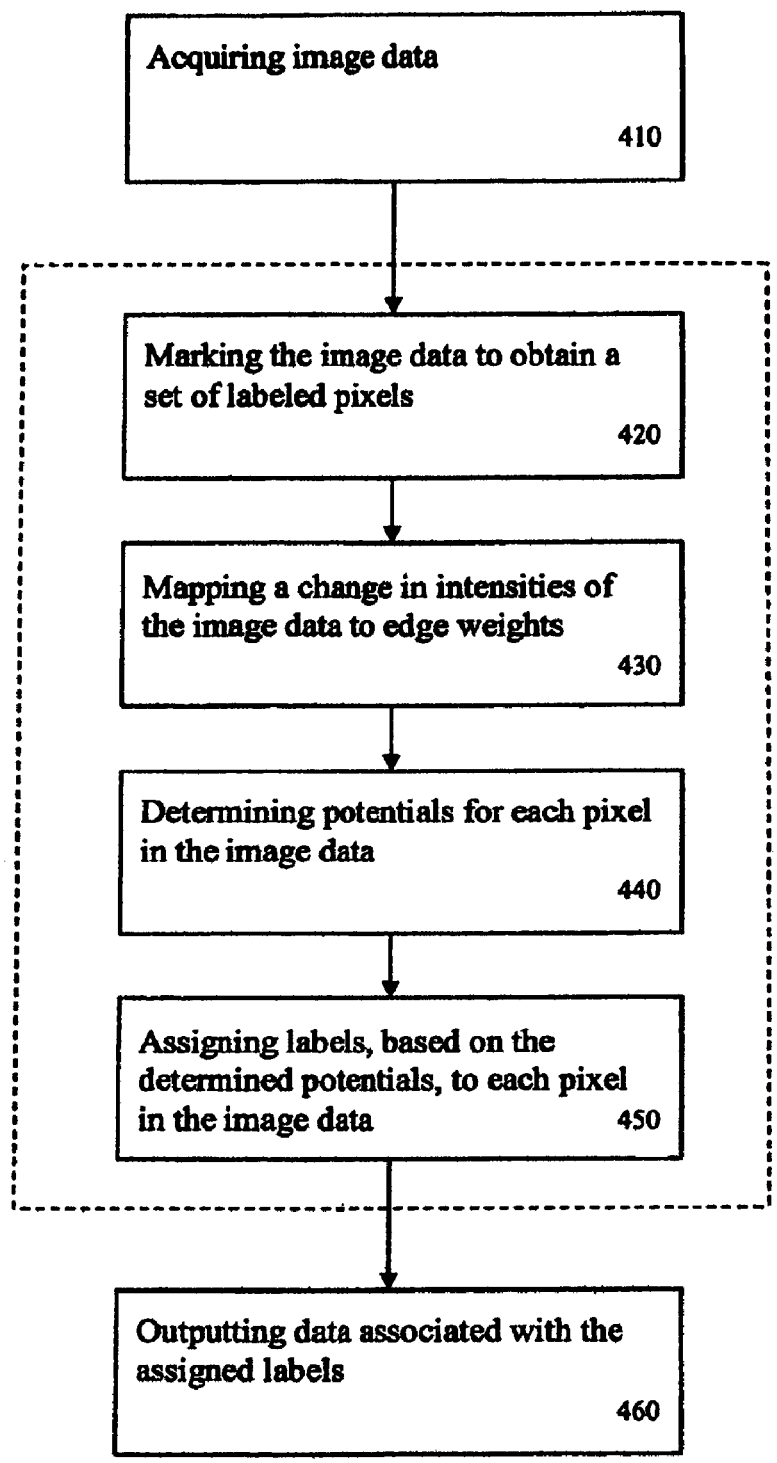
FIG. 5 illustrates a flow chart in accordance with one aspect of the present invention.

FIG. 5 summarizes a flow chart illustrating multi-label segmentation according to one aspect of the present invention. In step 410, image data is acquired. In step 420, the data is marked to obtain a set of labeled pixels. In step 430, a change in intensities of the data is mapped to edge weights. In step 440, the potentials for each pixel in the data is determined. In step 450, labels are assigned to each pixel based on the determined potentials. In step 460, data is associated with the assigned labels is output.

Numerical Practicalities

In order to perform the multi-label segmentation algorithm quickly and effectively any number of techniques used to solve large, sparse or symmetric linear systems of equations may be used. These techniques generally fall into two categories employing direct and iterative methods. A direct method, for example LU decomposition with partial pivoting, has an advantage that the computation necessary to solve equation [6] is only negligibly increased over the amount of work required to solve equation [5]. As current digital photos frequently exceed 10e7 pixels thus require an equal number of equations, most conventional computers do not have enough memory to allow an efficient LU decomposition with that number of equations.

The standard alternative to the class of direct solvers for large, sparse systems is the class of iterative solvers such as the Gauss-Seidel relaxation or conjugate gradients. These solvers have the advantage of a small memory requirement and the ability to represent the matrix-vector multiplication as a function. For example, because the matrix $L_U$ for a lattice has a circulant nonzero structure (although the coefficients are changing), one may avoid storing the matrix entirely. Instead, a vector of weights may be stored (or quickly computed, if memory is at a premium) and the operation $L_U x_U^s$ may be performed in a relatively inexpensive fashion. Further, sparse matrix operations (such as those required for conjugate gradients) may be efficiently parallelized for use on, for example, the GPU.

In accordance with one aspect of the present invention, a graphics processing unit (GPU) is implemented to accelerate the performance of a random walker method for image segmentation. The GPU supports floating-point textures; render to (multiple) textures; programmable pixel units using shaders with arithmetic instructions and random access to texture data; parallelism in calculations (SIMD instructions) by four values per texture element (RGBA); parallelism of pixel units (up to 16); and overall-performance higher than CPU.

A GPU approach results in a central processing unit (CPU) being virtually idle with respect to the image segmentation. There is almost no data transfer from or to graphics memory during the segmentation.

According to an embodiment of the present invention, a method for segmentation packs four different vectors into RGBA texture elements to solve four linear systems simultaneously. The method implements a sparse matrix as texture, handled by a Graphics Processing Unit (GPU).

The image data, the marked/unmarked voxels, the systems matrix, the right hand side vectors, and the solution vectors, are all represented on the GPU as floating-point textures. The determinations are made by rendering a rectangle primitive into the result floating-point texture, providing the relevant vectors and matrices as input textures, and performing the determinations on a fragment program. By using different textures as input/output and loading different fragment programs, the flow of the determination may be controlled.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

GPU Programming

A GPU may be used for tasks other than rendering images. General-purpose GPU programmers map various types of methods to the special architecture of GPUs. As described herein, textures may be treated as data storage and update processes.

For floating-point textures and precision modern graphics cards allocate textures with floating-point precision in each texel. Examples herein are described for 2D textures. 1D and 3D textures can be created as well, but with performance and update-disadvantages, respectively.

Textures are two-dimensional arrays of floating-point values, but each array element (texel) can hold up to four values. A texture is the data structure stored on a graphics card and processed by its GPU.

The latest graphics cards by NVIDIA and ATI offer 32-bits and 24-bits of floating-point precision respectively. While NVIDIA cards tend to be more accurate, ATI cards are much faster. Unfortunately, neither floating-point implementations are IEEE compliant.

For textures as a render target, updating values in a texture can be done by setting the texture as the render target and rendering a quadrilateral orthogonal onto it. The quadrilateral covers the part of the texture to be updated.

For each covered texel a pixel shader program is executed to update the texel. Shader programs allow sampling other input textures with random access, performing arithmetic operations and dynamic branching in control flow. The higher the shader version, the higher the larger the instruction count.

Operations on textures like element-wise addition and multiplication are the building blocks in general-purpose GPU implementations. Input textures can be bound to sampler units, constants may be passed to the GPU and an output texture needs to be set to store the results.

The following code example (in HLSL) shows how to multiply the corresponding components of two textures. The pixel shader program samples both input textures, performs the arithmetical operation and returns the result at each pixel location.

```
float4 psMultiply(PosTex v) : COLOR {
        float4 v0 = tex2D(sam0, v.TexCoords);
        float4 v1 = tex2D(sam1, v.TexCoords);
        return v0 * v1;
}
```

A more advanced example of an operation on the GPU is the determination of image gradients in shaders for instance.

Figure 6:
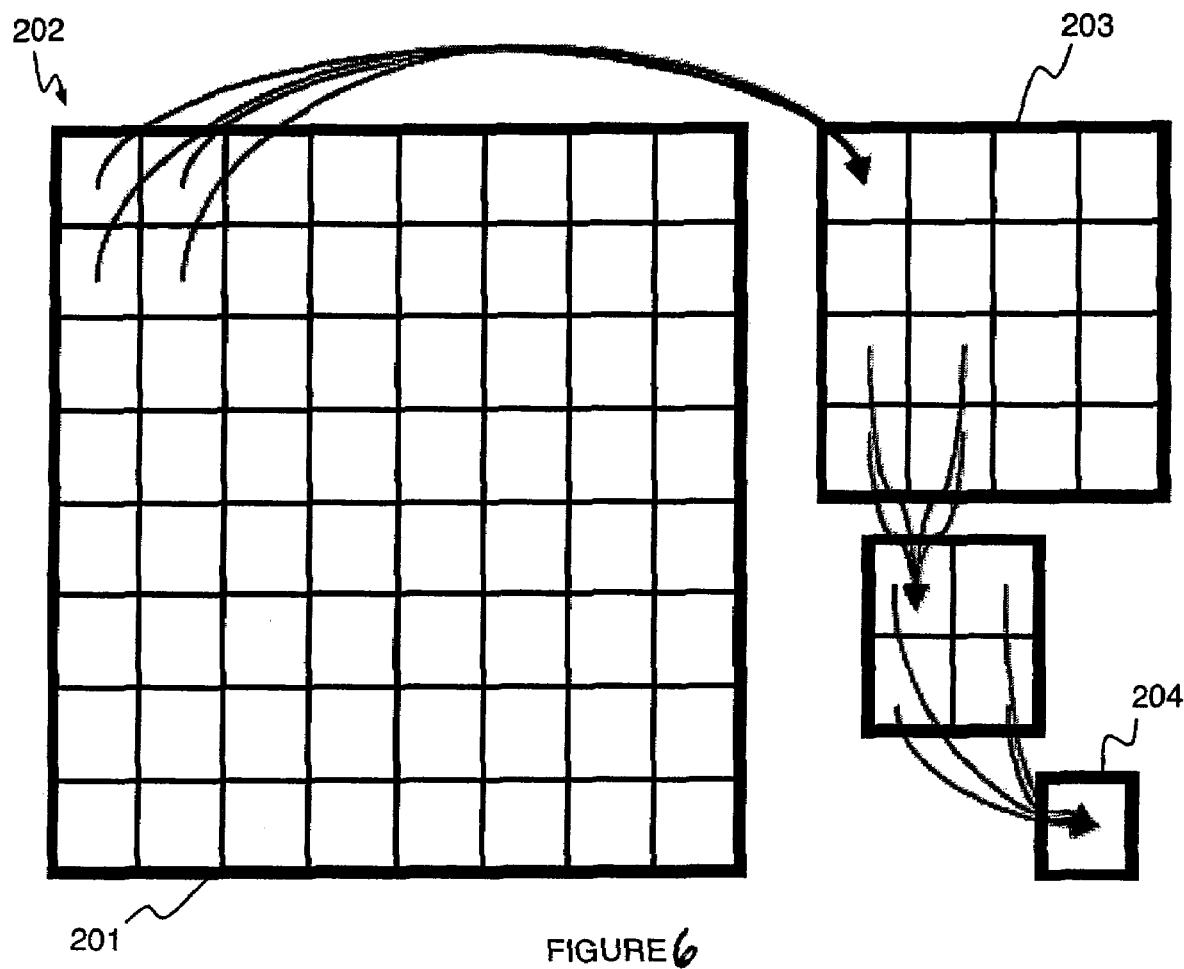
FIG. 6 is an illustration of a reduce operation according to an embodiment of the present disclosure.

One important operation for numerical computations is called the reduce operation, illustrated in FIG. 6. A reduce operation finds the maximum, minimum or average of all values in a texture, as well as the sum of all values. For example, if two vectors are stored as a texture the sum is important in order to calculate a dot product.

The reduce operation takes the original n×n texture 201 and performs the sum/avg/min/max operation on each 2×2 block, e.g., 202 while rendering a texture of n/2×n/2 203. Four values in the original texture are combined to a new one in the smaller texture. This procedure is repeated until the render target is a 1×1 texture 204 that contains the final-result. If the original texture width and height n is a power of two, a complete reduce chain comprises log n rendering passes until the result can be fetched. The implementation is done using a ping-pong buffer alternating two textures as read/write targets. In one pass texture A is used as render target and texture B set as input data, roles are reversed in the following pass.

Instead of combining 2×2 areas, e.g., 202, to an output value, a larger area such as 4×4 can be used.

Referring to vectors, representing a 1D vector as a 2D texture may not appear intuitive, but has performance advantages. The vector data is filled into a 2D texture linearly. Four vectors are put into one texture to fill the RGBA channels according to an embodiment of the present disclosure.

The dot product of two vectors is determined by multiplying the corresponding vector component storing the results in an output texture followed by a reduce operation to sum all the multiplied components together.

Masking may be implemented for algorithms needing certain parts of a texture to be unchanged while updating the rest of the components. To avoid defining a complicated geometry to mask out those regions, the Z-buffer can used to mask out arbitrary regions. This needs the Z-buffer to be at least as large as the texture. Depending on the Z-test function regions to update are either set to 1 and the rest to 0 or vice versa. The Z-test function compares the Z value of the incoming pixel to the one of the render target to determine if the pixel is rendered or discarded. Z-tests can be any of the following comparison tests:

$<, \leq, =, \neq, \geq, >$.

Rendering a quadrilateral in the z=0.5 plane prevents pixels in masked regions from entering the pixel pipeline. These pixels are discarded immediately instead of blocking the pipeline.

To take advantage of the 4-channel parallelism on GPUs there are several ways to pack the data. One option is to pack an n×n texture (with one channel) into an n/2×n/2 texture with four channel. This approach needs additional packing and unpacking passes and the Z-buffer cannot be used as a mask anymore. A packing method not needing packing and unpacking passes with working Z-test has been described.

Random Walker Implementation

Figure 7:
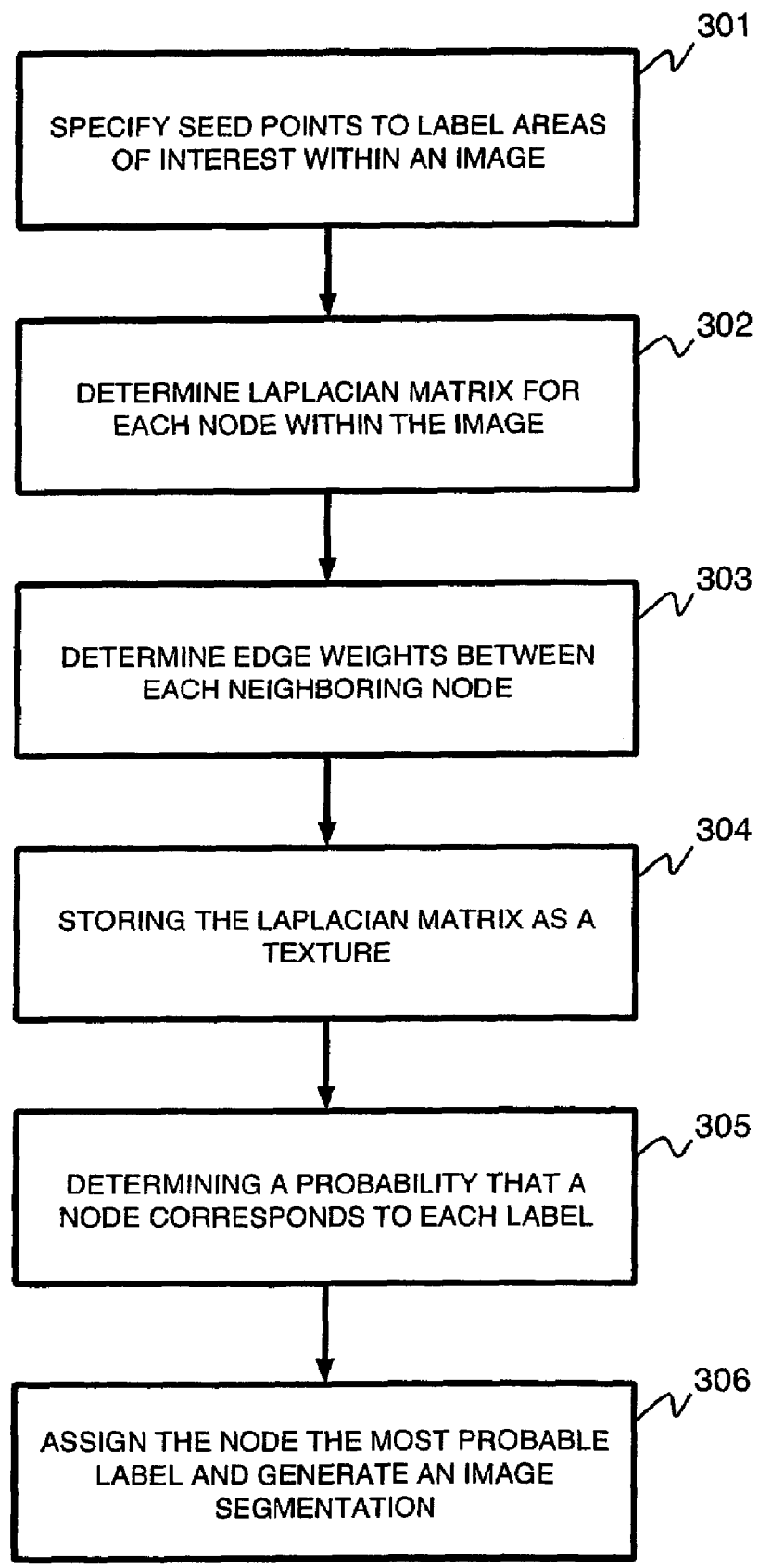
FIG. 7 illustrates a segmentation method according to one aspect of the present invention.

Referring to FIG. 7, a segmentation method according to an embodiment of the present disclosure includes specifying seed points to mark areas of interest 301. Seed points may be provided manually or automatically by known methods. The method includes storing two or more different seed colors in the RGBA channels of a seed texture 302, multiple colors in one place are prohibited. The method includes determining a Laplacian matrix 303 for each node (e.g., pixel) and storing the Laplacian matrix as a texture representation 304 using the edge weights. A system of linear equations is solved using a conjugate gradients method to give a probability that each node corresponds to each seed point 305. Each node is labeled according to a most probable label and the segmentation is generated 306.

Figure 8B:
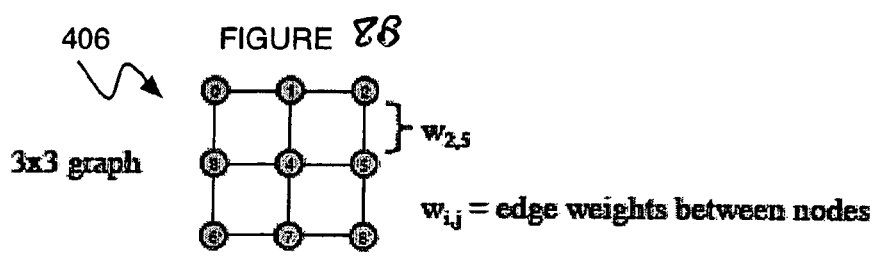
FIG. 8B is a 3×3 graph/image according to an embodiment of the present disclosure.
Figure 8A:
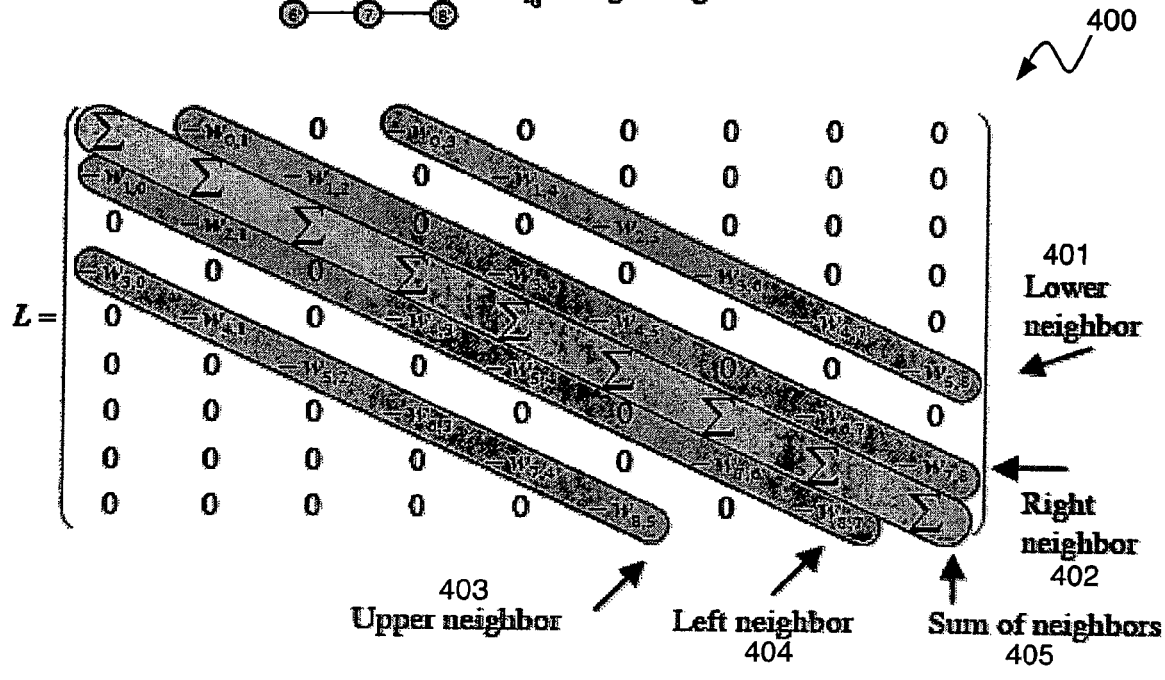
FIG. 8A is a Laplacian matrix corresponding to a 3×3 graph/image according to an embodiment of the present disclosure.

The structure of the Laplacian matrix 400, for example see FIG. 8A, is suited for a texture representation. In 2D it has five diagonal bands 401-405. The secondary bands 401-404 hold the edge weights to neighboring pixels (nodes in the graph) and the main diagonal band 405 is the sum of the four secondary bands 401-404. FIG. 8B shows an example of a 3×3 image 406.

Since the diagonal 405 is the sum of the secondary diagonals 401-404, values on main diagonal need not be kept. The matrix is saved in a row-wise manner. This corresponds to storing the edge weights to the four neighboring pixels for each pixel. Four values fit to a four channel texture perfectly as illustrated in FIG. 9.

Figure 9:
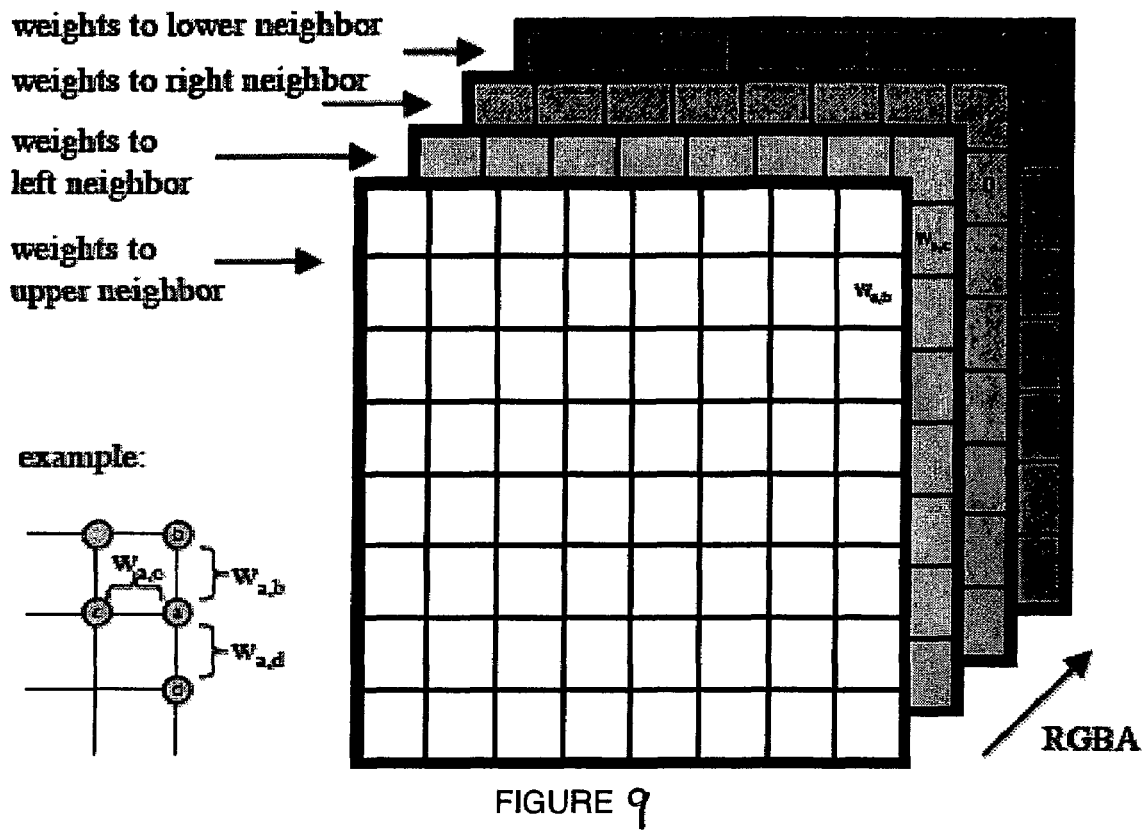
FIG. 9 is an illustration of an L-metric texture for storing four neighboring edge weights of an edge node according to an embodiment of the present disclosure.
Figure 10:
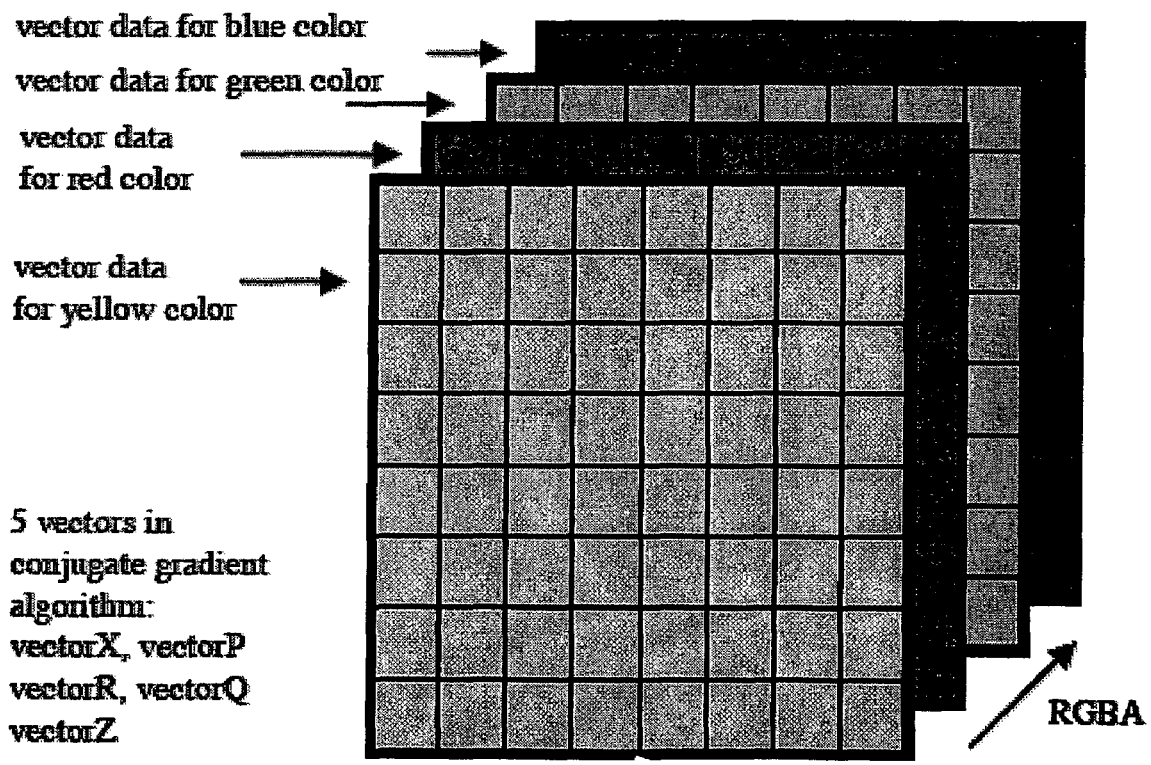
FIG. 10 is a conjugate gradient vector according to an embodiment of the present disclosure.

FIG. 9 illustrates the L-matrix texture storing the four neighboring edge weights of each node. The main diagonal can be computed by summing the four edge weights at each node. FIG. 10 shows a conjugate gradient vector according to one aspect of the present invention.

A single rendering pass is required to calculate the edge weights and store the Laplacian matrix in its texture representation.

Furthermore, only one rendering pass is needed to determine a matrix-vector multiplication as described herein.

For the matrix-vector multiplication, with the Laplacian matrix structure the matrixvector multiplication can be determined in a single rendering pass. At each pixel location the vector is fetched together with its four neighbors. Those five values need to be multiplied with the five matrix diagonals component-wise. The four secondary bands can be fetched by sampling the Laplacian texture at the current position. The main diagonal is the sum of the secondary diagonals. The pixel shader code below shows an implementation of a matrixvector product.

```
float4 psMatrixVector(PosTex5 v) : COLOR {
        // get Laplacian matrix (secondary diagonals)
        float4 L = tex2D(sam0, v.TexCoordsC);
        // get Laplacian main diagonal
        // dot(L,1) = L.r + L.g + L.b + L.a
        float diag = dot(L,1);
        // sample vector
        float4 vecc = tex2D(sam1, v.TexCoordsC); // center
        float4 vecu = tex2D(sam1, v.TexCoordsU); // up
        float4 vecl = tex2D(sam1, v.TexCoordsL); // left
        float4 vecr = tex2D(sam1, v.TexCoordsR); // right
        float4 vecd = tex2D(sam1, v.TexCoordsD); // down
        return diag*vecc - L.r*vecu - L.g*vecl
            - L.b*vecr - L.a*vecd;
}
```

Assuming the Laplacian texture to be bound to sampler unit 0 (sam0), the four edge weights of the current texel are read and stored in the four-component vector L. Now the secondary diagonal entries of the current pixel (node) are present in the RGBA components of L. The next line computes the main diagonal value by summing up all secondary values. The fastest way to sum up four components on the GPU is by calculating a dot product of the vector with 1, since it is a one cycle operation.

$$dot(L, 1) = (1 \times L.r) + (1 \times L.g) + (1 \times L.b) + (1 \times L.a)$$

The vector texture is supposed to be bound to sampler unit 1 (sam1). Using five sets of texture coordinate interpolators the address determination for neighboring texels is done in the vertex unit, thus saving instructions in the pixel shader. With that, the vector is sampled and stored in the vec[x] variables.

The matrix-vector product, and output texture, can be determined by multiplying the vector data vec[x] by the matrix entries diag and L.

For the solution of a system of linear equations, while the Random Walker method allows an arbitrary number of label colors, a GPU implementation according to an embodiment of the present disclosure is most efficient when using multiples of four, due to the RGBA channels of a texture. Here yellow, red, green and blue are used to represent those colors. Each color is assigned to one channel of RGBA.

Five vectors or textures are needed to determine a conjugated gradient algorithm: X,P,R,Q,Z. In total this takes about 35 MB of memory for a $512^2$ image and less than 10 MB for a $256^2$ image. FIG. 4 illustrates a conjugate gradient vector stored in a texture for four different colors.

For each color a system of linear equations has to be solved. Further, all four systems (e.g., yellow, red, green and blue) are solved simultaneously, because all operations on vectors and matrices are done in parallel for all colors. This allows to solve four linear systems at the cost of one. Needed GPU operations are vector addition, dot product and matrix-vector product. The solution of the system of equations gives probabilities that a node corresponds to each label. A segmentation result is determined from the probabilities, labeling each node according to a most probable label. The system and method may be implemented using two or more labels.

A preferred implementation of the random walker algorithm in a graphics processing unit is also described in U.S. patent application Ser. No. 11/029,442, filed on Jan. 5, 2005 and in U.S. Provisional Patent Application No. 60/628,035, filed on Nov. 15, 2004, both of which are incorporated herein by reference.

Figure 11:
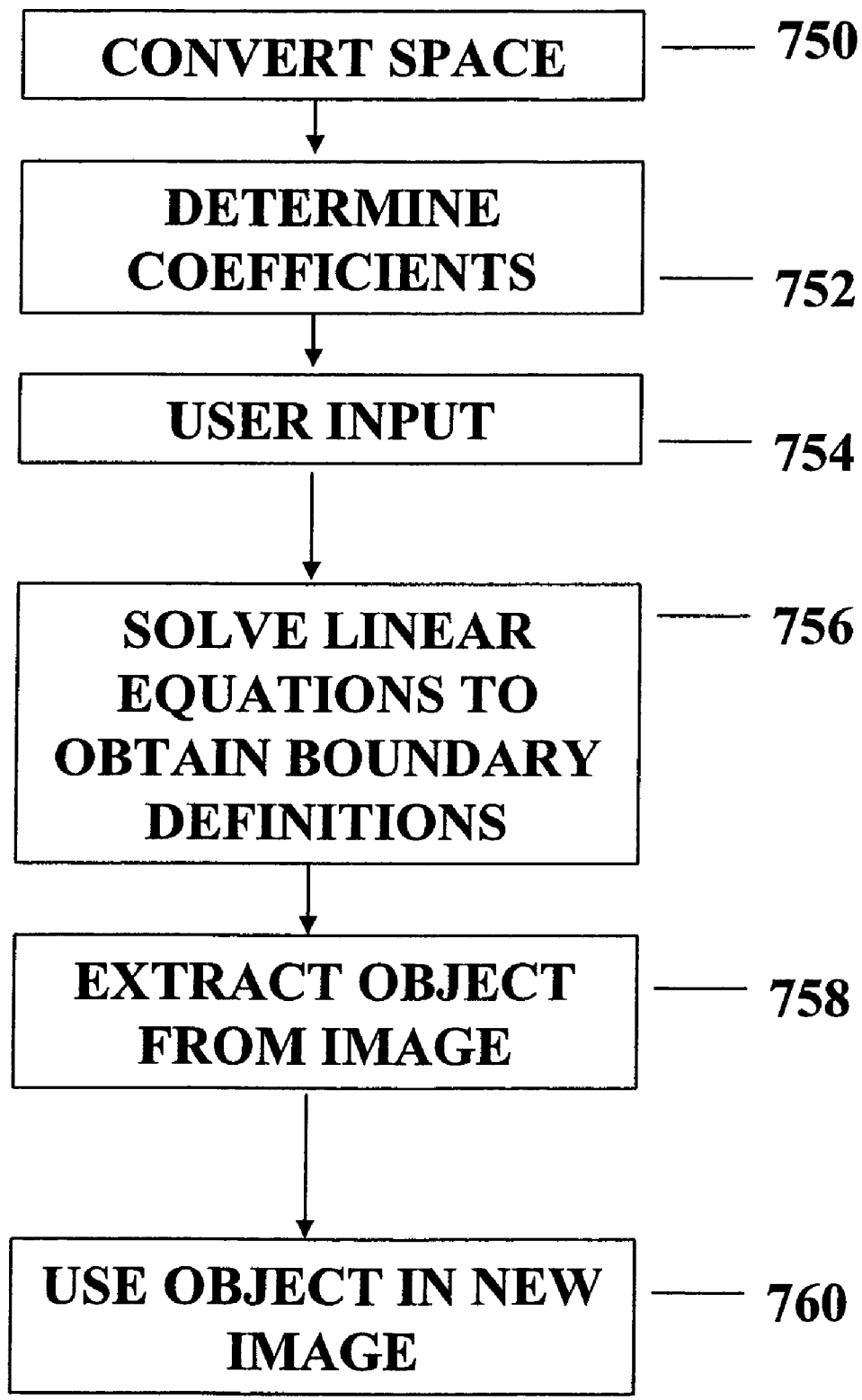
FIG. 11 illustrates a process in accordance with one aspect of the present invention.

FIG. 11 summarizes the process in accordance with one aspect of the present invention. In step 750, the data from the image 10 is preferably, but not necessarily, converted into a near-Euclidean LUV color space or a Lab color space. This is a well known space and the conversion process into this color space is well known. This step 750 is preferably performed as it has been found that processing in this space yield better results. In step 752, the coefficients are determined and the matrix of coefficients is determined. In step 754, the user inputs or marks certain pixels to designate foreground and background nodes. In step 756, the system of linear equations—as represented by the matrix—is solved. After step 756, the boundaries of the object in an image is known. In the remaining steps, further processing of the object is performed. For example, in step 758, the object is extracted from the image by known editing tools, based on the determined boundary. In step 760, the extracted object can be used in a new image. Of course, the object can be used and processed in a number of different ways.

The present invention has been described with respect to two dimensional images (such as photos). The present invention, however, can be applied to three dimensional structures (or lattice structures) obtained from a two dimensional structure obtained over time (such as videos). This can be accomplished using the weighting coefficient equations set forth above.

Figure 12:
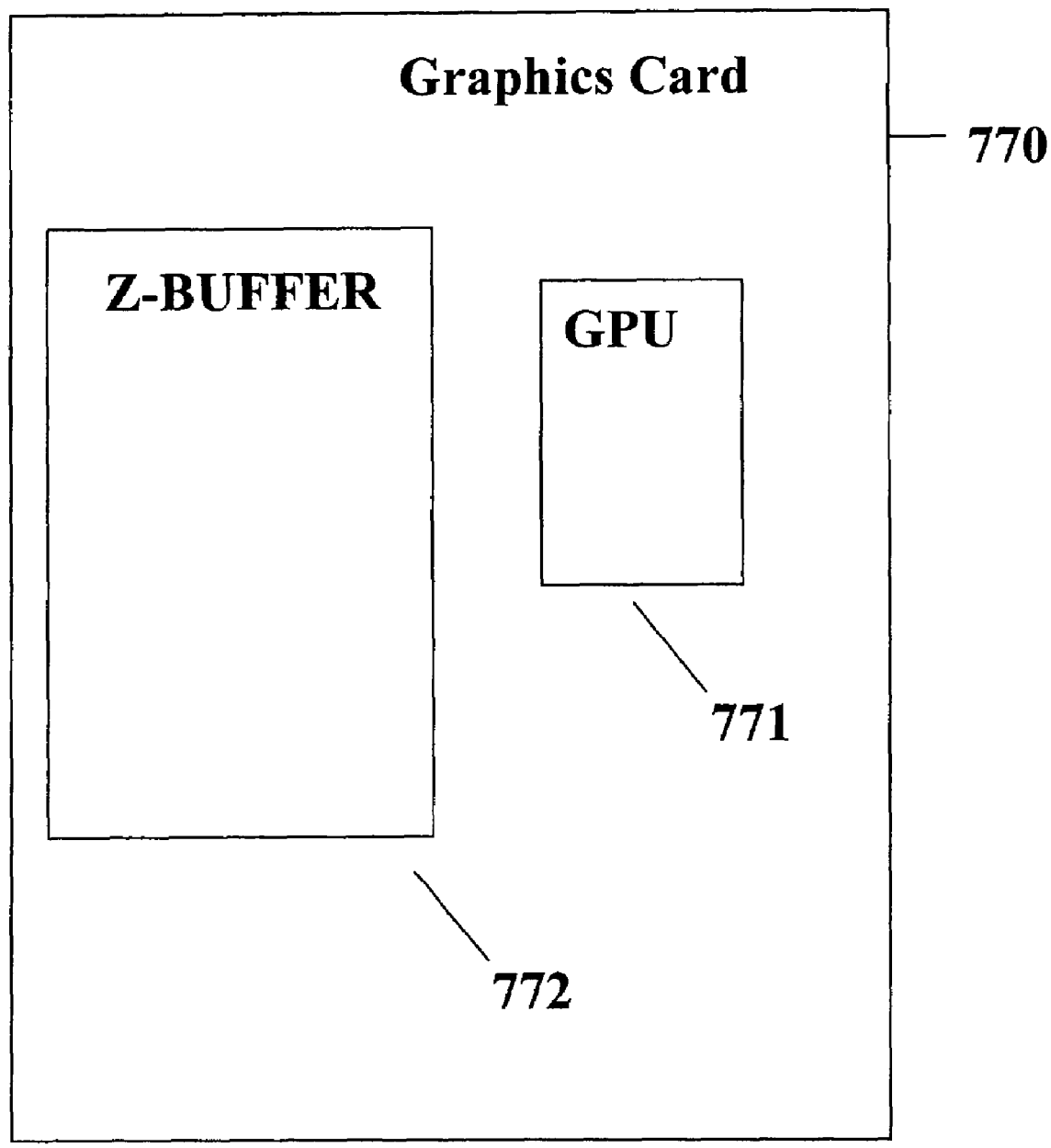
FIG. 12 illustrates the use of a Z-buffer in a graphics processor unit in accordance with one aspect of the present invention.

In accordance with another aspect of the present invention, the processing of the system of linear equations in the graphics processing unit is preferably performed using a Z-buffer. FIG. 12 illustrates a graphics card 770, a graphics processing unit (GPU) 771 and a Z-buffer 772 in the graphics processing unit 770. The Z-buffer 772 is normally used to mask out non-visible pixels. In accordance with the present invention, the pixels representing the foreground node and the background node that have been selected by a user are placed in the Z-buffer so that they are not included in the calculations. This saves processing time since it is unnecessary to include calculations concerning the user selected pixels in the random walk algorithm.

Figure 13:
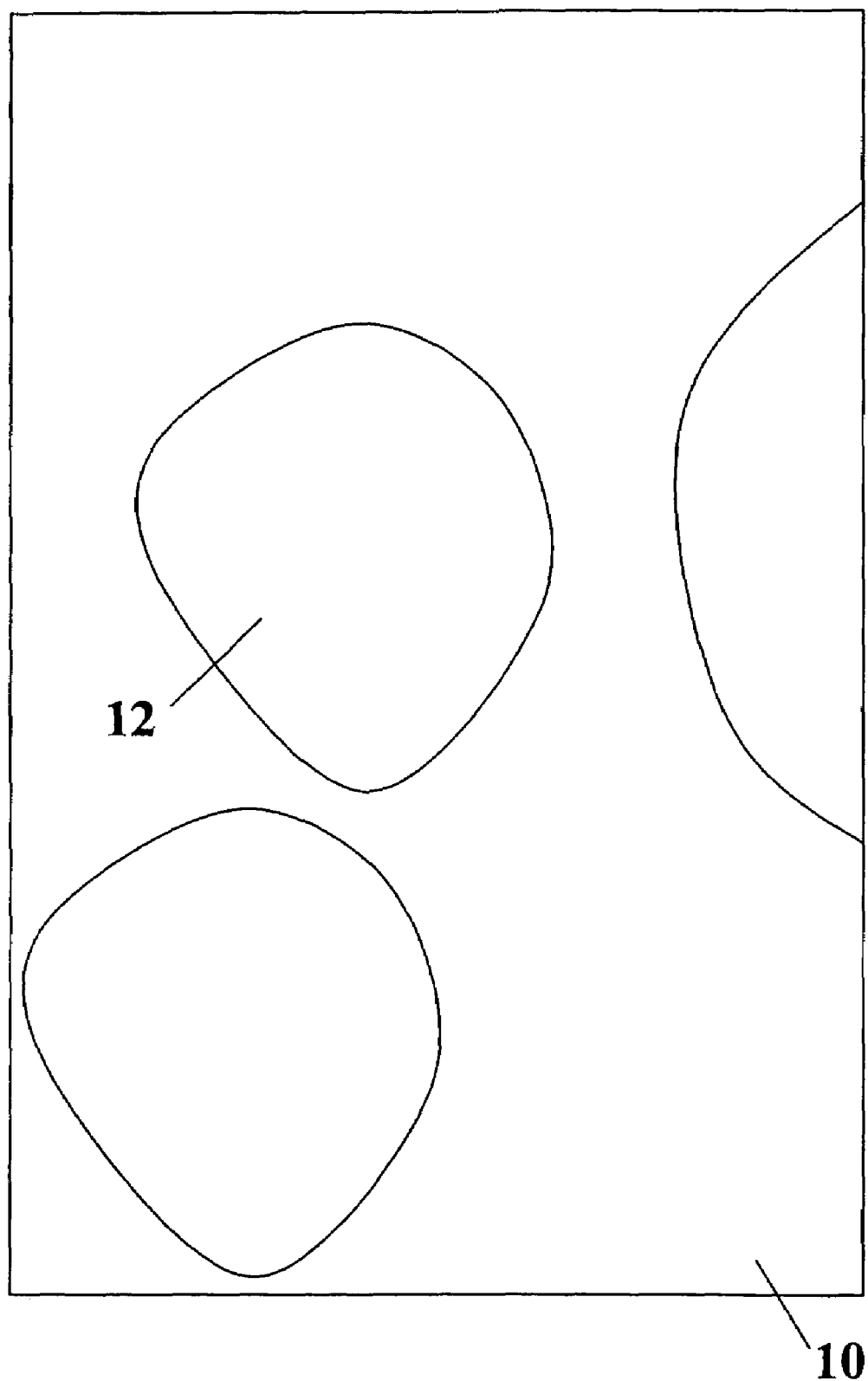
FIG. 13 illustrates a digital image having more than two pixels marked.

As previously discussed, it is also possible to mark a plurality of objects in an image to determine the boundaries of each of the objects, as illustrated in FIG. 13. Foreground nodes and background nodes can be marked for each of the objects. In general the number of objects in the image is K and the number of marked nodes is N and K is less than or equal to N.

Using the random walk algorithm as previously discussed, this creates K systems of linear equations to solve.

Figure 14:
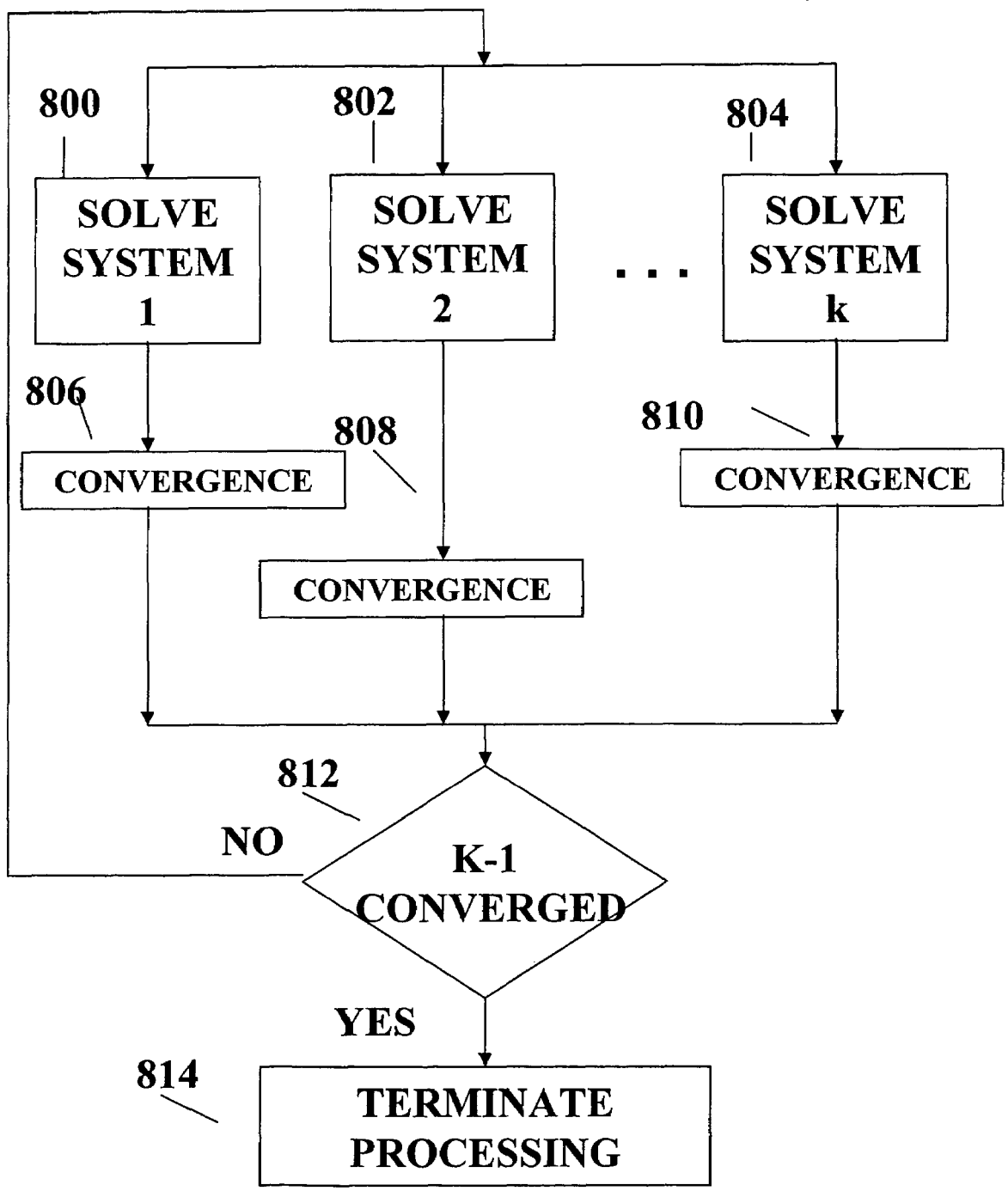
FIG. 14 illustrates a method of processing the information in a digital image having more than two labels marked.

In accordance with one aspect of the present invention, all of the systems of linear equations are solved. Thus, as illustrated in FIG. 14, all three of these systems are solved in parallel in steps 800, 802 and 804. This means, for each system, the weighting coefficients are determined and the resulting sets of linear equations are solved. In step 806, it is determined whether the processing in step 800 has converged to an answer. In step 808, it is determined whether the processing in step 802 has converged to an answer. In step 810, it is determined whether the processing in step 804 has converged to an answer. In step 812, it is determined when the processing relating to K–1 the systems (in steps 800, 802 and 804) has converged to an answer that defines the boundaries of the objects in an image. When it is determined that the processing relating to K–1 of the systems has converged, the solutions of the K–1 systems determines the solution of the Kth system. Then all of the boundaries can be determined, and further processing to solve the systems is terminated in step 814. The segmented object can then be processed or used in any desired way.

Figure 15:
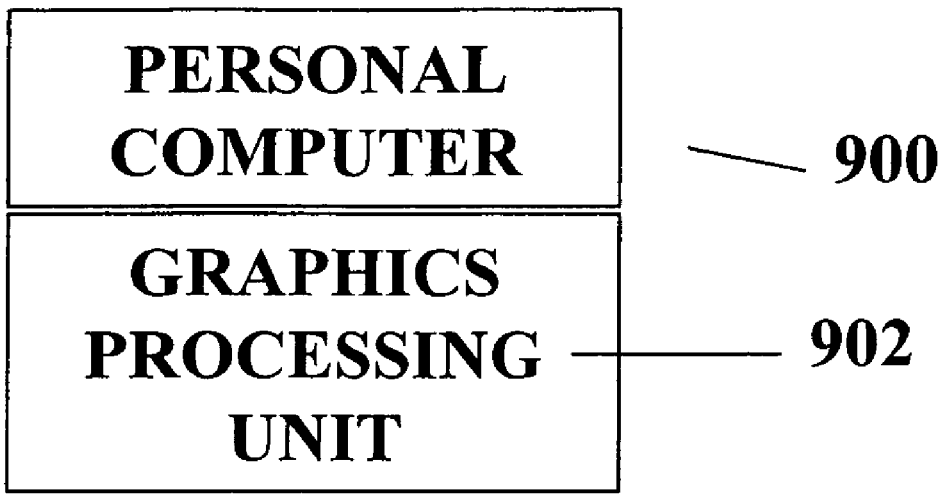
FIGS. 15 and 16 illustrate various systems in which the present invention can be used.

FIG. 15 illustrates computer hardware that can be used in the various aspects of the present invention. The steps of the present invention are preferably performed by a personal computer 900. In accordance with a preferred embodiment of the present invention, the personal computer includes a graphics processing unit 902. Much of the processing required by the present invention, as previously discussed, is performed in the graphics processing unit 902. The graphics processing unit 902 can be any of the well known graphics processing units available now or in the future. By way of example only, graphics processing units available from NVIDIA and ATI can be used to implement the present invention.

Figure 16:
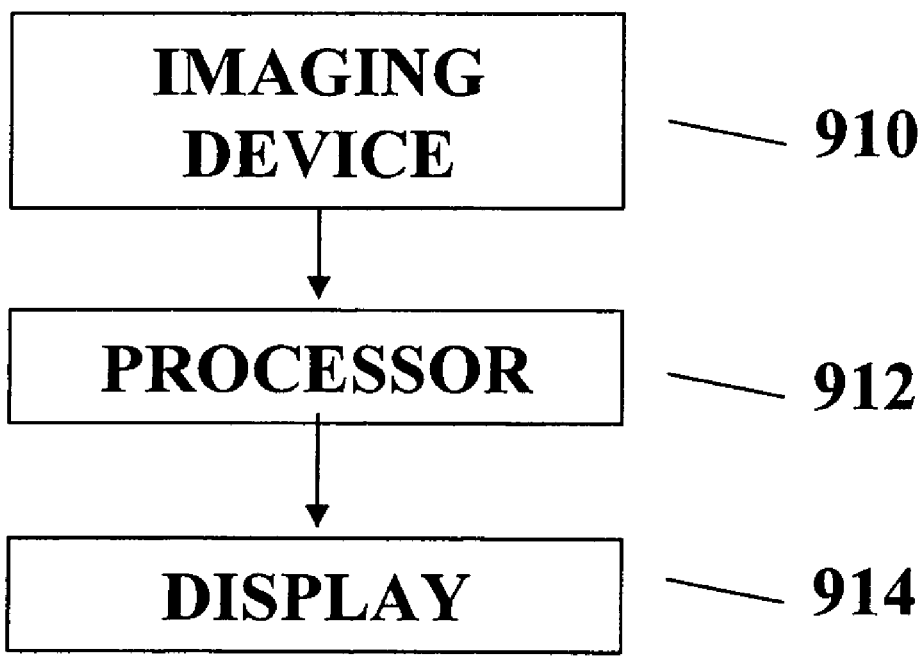

FIG. 16 illustrates another system that the present invention can be used with. The system includes an imaging device 910, a processor 912 and a display 914. The imaging device can be any type of imaging device including, but not limited to, medical imaging instruments, digital cameras or video cameras. The processor 912 can be any type of processor, including, but not limited to, personal computers, workstations, parallel connection of computers, and the like. The display 914 can be any type of display. These components can be co-located in the same room or can be in different rooms. Further, the components can be connected by a dedicated wire, by a network or by any other connection means.

The present invention significantly speeds up the segmentation of objects in a digital image. For example, in a 512×512 digital still image, prior segmentation methods have taken as long as 100 seconds to perform the processing necessary to segment an object from an image. In general, the processing speed to segment a similar digital still image using a graphics processing unit has been reduced to approximately 2.6 to 6 seconds. With a new ATI graphics processing card, processing time to segment an object in a 512×512 digital still image has be reduced to as low as 1.5 seconds. While the actual reduction in processing time will depend on the selected foreground and background pixels and on the number of selected pixels, there is a significant reduction in processing speed associated with the use of the present invention.

While the specification has primarily described the invention with respect to pixels, it is also applicable to sets of image data having voxels, or three dimensions of data. Thus, the word pixel can also refer to voxel. The use of the word node shall be understood to refer to either pixel or voxel.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method of segmenting an object in a digital image having a plurality of pixels, comprising:
    selecting a foreground node located in the object and a background node outside of the object;
    determining a plurality of coefficients, each one of the plurality of coefficients being a function of the relative image data associated with two of the plurality of pixels, each pixel having a vector of color values;
    storing only diagonals of a Laplacian matrix related to the plurality of coefficients as a texture and computing a main diagonal from the stored diagonals for processing by a graphics processing unit;
    solving up to 4 different systems of linear equations simultaneously at the computational cost of one system based on a random walker segmentation with the Laplacian matrix, the systems of linear equations including the plurality of coefficients and being dependent on the foreground node and the background node, using a texture processing architecture of the graphics processing unit; and
    determining a potential for each pixel in the plurality of pixels from the solving a system of linear equations.

2. The method as claimed in claim 1, wherein the function includes the difference in a first image intensity at a first pixel and a second image intensity of a second pixel.

3. The method as claimed in claim 1, wherein the function includes the difference in a first vector of colors at a first pixel and a second vector of colors at a second pixel.

4. The method as claimed in claim 1, comprising extracting the object from the digital image based on the potential determined for each of the pixels.

5. The method as claimed in claim 1, wherein the plurality of coefficients is determined using a near-Euclidean LUV color space.

6. The method as claimed in claim 1, wherein the plurality of coefficients is determined using a Lab color space.

7. The method as claimed in claim 1, wherein the foreground node and the background node are masked out by a Z-buffer in the graphics processing unit.

8. The method as claimed in claim 6, wherein the foreground node and the background node are masked out by a Z-buffer in the graphics processing unit.

9. The method as claimed in claim 8, comprising extracting the object from the digital image based on the potential determined for each of the pixels.

10. The method as claimed in claim 9, wherein the method is performed by a digital imaging editing tool.

11. The method as claimed in claim 1, wherein the digital image is a still image.

12. The method as claimed in claim 1, wherein the digital image is a video image.

13. The method as claimed in claim 1, comprising converting data representative of the digital image from one space to a near-Euclidean LUV color space prior to determining the plurality of coefficients.

14. The method as claimed in claim 1, comprising converting data representative of the digital image from one space to a Lab color space prior to determining the plurality of coefficients.

15. A system for segmenting an object in a digital image having a plurality of nodes, wherein a foreground node located within the object and a background node located outside of the object are selected, comprising:
    means for determining a plurality of coefficients, each one of the plurality of coefficients being a function of by determining the relative image data associated with two of the plurality of pixels, each pixel having a vector of color values;
    a memory for storing only diagonals of a Laplacian matrix related to the plurality of coefficients as a texture and computing a main diagonal from the stored diagonals for processing by a graphics processing unit; and
    the graphics processing unit for solving up to 4 different systems of linear equations simultaneously at the computational cost of one system based on a random walker segmentation, the system of linear equations including the plurality of coefficients and being dependent on the foreground node and the background node, to determine a potential for each pixel in the plurality of pixels.

16. The system as claimed in claim 15, wherein the function includes the difference in a first image intensity at a first pixel and a second image intensity of a second pixel.

17. The system as claimed in claim 15 wherein the function includes the difference in a first vector of colors at a first pixel and a second vector of colors at a second pixel.

18. The system as claimed in claim 15, comprising means for extracting the object from the digital image based on the potential determined for each of the pixels.

19. The system as claimed in claim 15, wherein the plurality of coefficients is determined using a near-Euclidean LUV color space.

20. The system as claimed in claim 15, wherein the plurality of coefficients is determined using a Lab color space.

21. The system as claimed in claim 15, wherein the foreground node and the background node are masked out by a Z-buffer in the graphics processing unit.

22. The system as claimed in claim 20, wherein the foreground node and the background node are masked out by a Z-buffer in the graphics processing unit.

23. The system as claimed in claim 22, comprising means for extracting the object from the digital image based on the potential determined for each of the pixels.

24. The system as claimed in claim 23, further comprising a digital imaging editing tool.

25. The system as claimed in claim 15, wherein the digital image is a still image.

26. The system as claimed in claim 15, wherein the digital image is a video image.

27. The system as claimed in claim 15, comprising means for converting data representative of the digital image from one space to a near-Euclidean LUV color space so that the near-Euclidean LUV color space can be used by the means for determining the plurality of coefficients.

28. The system as claimed in claim 15, comprising means for converting data representative of the digital image from one space to a Lab color space so that the Lab color space can be used by the means for determining the plurality of coefficients.

29. A method of segmenting, using a graphics processing unit, a digital image having a plurality of pixels and K objects, with K being greater than 1 and less than 5, the digital image being marked by a set of marked nodes, at least one of the marked nodes being located within an object of the K objects and at least one of the marked nodes being located outside of the object are selected, comprising:

determining K systems to be solved;

for each of K systems, determining a plurality of coefficients by determining the relative image data associated with two of the plurality of pixels, each pixel having a vector of color values; for each of the K systems, solving simultaneously by the graphics processing unit of a system of linear equations, each system of linear equations including the plurality of coefficients and being dependent on the foreground node and the background node, to determine a boundary of the objects;

determining when K−1 of the K systems have converged to an answer that indicates a location of a boundary of the objects;

when it is determined that K−1 of the K systems has converged, terminating the solving of the system of linear equations that have not converged and determining the solution of the unconverged system based on the solutions of the converged systems.

* * * * *

UNITED STATES PATENT AND TRADEMARK OFFICE
CERTIFICATE OF CORRECTION

PATENT NO. : 7,630,549 B2 Page 1 of 1
APPLICATION NO. : 11/242549
DATED : December 8, 2009
INVENTOR(S) : Aharon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this

Second Day of November, 2010

David J. Kappos
*Director of the United States Patent and Trademark Office*